US012771953B2

(12) United States Patent
Jang et al.

(10) Patent No.: US 12,771,953 B2
(45) Date of Patent: Oct. 20, 2026

(54) APPARATUS AND METHOD FOR OBTAINING IMAGE USING LENS ARRAY

(71) Applicant: SAMSUNG ELECTRONICS CO., LTD., Suwon-si (KR)

(72) Inventors: Soongeun Jang, Suwon-si (KR); Woo-Shik Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 220 days.

(21) Appl. No.: 18/658,571

(22) Filed: May 8, 2024

(65) Prior Publication Data

US 2025/0039562 A1 Jan. 30, 2025

(30) Foreign Application Priority Data

Jul. 28, 2023 (KR) ........................ 10-2023-0099003

(51) Int. Cl.

*H04N 23/88* (2023.01)
*H04N 5/265* (2006.01)
*H04N 25/11* (2023.01)
*H04N 25/60* (2023.01)

(52) U.S. Cl.

CPC ............. *H04N 23/88* (2023.01); *H04N 5/265* (2013.01); *H04N 25/11* (2023.01); *H04N 25/60* (2023.01)

(58) Field of Classification Search

CPC ........ H04N 23/88; H04N 5/265; H04N 25/11; H04N 25/60; H04N 23/84; H04N 25/134; H04N 25/70; H04N 1/3876; H04N 23/81; H04N 23/951; H04N 25/79; H04N 25/704; H04N 25/61; H04N 25/771; G06T 3/4015; H10F 39/8063

See application file for complete search history.

(56) References Cited

U.S. PATENT DOCUMENTS 11,589,035 B1 2/2023 Lin
2010/0128152 A1* 5/2010 Hayasaka ............ G02B 13/001 348/277

(Continued)

FOREIGN PATENT DOCUMENTS

JP 2015-207831 A 11/2015
JP 2019-87860 A 6/2019

(Continued)

OTHER PUBLICATIONS

Cheng, Zhen et al., "Light Field Super-Resolution with Zero-Shot Learning", IEEE, CVPR 2021, pp. 10010-10019. (10 pages total).

(Continued)

*Primary Examiner* — Abdelaaziz Tissire
(74) *Attorney, Agent, or Firm* — Sughrue Mion, PLLC

(57) ABSTRACT

An image obtaining apparatus includes an image sensor including a micro lens and a plurality of neighboring pixels sharing the micro lens and a processor configured to generate, based on an input image received from the image sensor, a plurality of parallax images having a same parallax, group, from among the plurality of parallax images, first parallax images having similar image characteristics, perform at least one image processing operation on the first parallax images, and generate an output image by combining the first parallax images on which the at least one image processing operation is performed.

20 Claims, 20 Drawing Sheets

(56) References Cited

U.S. PATENT DOCUMENTS

| | | | | |
|---|---|---|---|---|
| 2012/0176480 | A1* | 7/2012 | Chiang | H04N 13/239 348/78 |
| 2013/0222553 | A1* | 8/2013 | Tsuchita | H04N 13/286 348/49 |
| 2014/0198188 | A1* | 7/2014 | Izawa | H04N 13/106 348/49 |
| 2017/0085858 | A1 | 3/2017 | Kitago | |
| 2019/0141343 | A1 | 5/2019 | Matsuoka | |
| 2021/0150748 | A1 | 5/2021 | Ciurea et al. | |
| 2022/0108424 | A1* | 4/2022 | Gan | G06T 3/4015 |
| 2022/0210378 | A1 | 6/2022 | Tseng et al. | |
| 2023/0023853 | A1 | 1/2023 | Jang et al. | |
| 2024/0171871 | A1* | 5/2024 | Kim | H04N 25/704 |
| 2024/0244333 | A1 | 7/2024 | Jang et al. | |
| 2024/0249513 | A1 | 7/2024 | Jang et al. | |
| 2024/0273685 | A1* | 8/2024 | Kim | G06T 5/70 |
| 2024/0314459 | A1* | 9/2024 | Jang | H04N 25/46 |
| 2025/0039561 | A1 | 1/2025 | Jang et al. | |

FOREIGN PATENT DOCUMENTS

| | | | |
|---|---|---|---|
| KR | 10-2015-0046113 | A | 4/2015 |
| KR | 10-2024-0114659 | A | 7/2024 |
| KR | 10-2024-0117327 | A | 8/2024 |

OTHER PUBLICATIONS

Sharif, S M A et al., "Beyond Joint Demosaicking and Denoising: An Image Processing Pipeline for a Pixel-bin Image Sensor", arXiv:2104.09398v1 [cs.CV], Apr. 19, 2021. (10 pages total).

Communication issued Sep. 24, 2024 by the European Patent Office in European Patent Application No. 24191195.7.

* cited by examiner

APPARATUS AND METHOD FOR OBTAINING IMAGE USING LENS ARRAY

CROSS-REFERENCE TO RELATED APPLICATION

This application is based on and claims priority under 35 U.S.C. § 119 to Korean Patent Application No. 10-2023-0099003, filed on Jul. 28, 2023, in the Korean Intellectual Property Office, the disclosure of which is incorporated by reference herein in its entirety.

BACKGROUND

1. Field

The disclosure relates to an apparatus and method for obtaining an image using a lens array.

2. Description of Related Art

An image sensor may include red, green, and blue color filters arranged in a regular pattern on a light sensing pixel for imaging color images. For example, a color filter may include a quad Bayer pattern in which 2×2 pixels of a same color are arranged under one micro lens. The quad Bayer pattern may be used for auto focusing on a target object, using the parallax of light passing through the same micro lens.

An image signal processor (ISP) may perform image processing on an input image generated by an image sensor. The ISP may generate an output image from the input image based on various registers (or parameters), and according to values of parameters applied to the ISP, the quality, characteristics, etc. of the image may vary.

As the number of pixels of image sensor increases, an apparatus for obtaining a high-resolution image may require additional logics and memories for performing image processing.

SUMMARY

Provided are an apparatus and a method for obtaining an image, in which an increase in logic and memory in the apparatus for performing image processing is minimized.

Additional aspects will be set forth in part in the description which follows and, in part, will be apparent from the description, or may be learned by practice of the presented embodiments of the disclosure.

According to an aspect of the disclosure, an image obtaining apparatus may include an image sensor including a micro lens and a plurality of neighboring pixels sharing the micro lens; and a processor configured to generate, based on an input image received from the image sensor, a plurality of parallax images having a same parallax, group, from among the plurality of parallax images, first parallax images having similar image characteristics, perform at least one image processing operation on the first parallax images, and generate an output image by combining the first parallax images on which the at least one image processing operation is performed.

The first parallax images may include a first parallax image group and a second parallax image group and the processor may be configured to perform the at least one image processing operation on the first parallax images by performing image processing on the first parallax image group and the second parallax image group using context switching.

The processor may include two logic circuits connected in parallel and configured to simultaneously image-process the first parallax images and a memory configured to be shared and used by the two logic circuits.

The memory may include random access memory (RAM) including a kernel memory area and the processor may be configured to perform the at least one image processing operation on the first parallax image group and the second parallax image group using context switching by preloading a register corresponding to the second parallax image group to a process control block of the kernel memory area during performing of the at least one image processing operation on the first parallax image group.

The image sensor may include a quad Bayer pattern array in which pixels arranged in a 2×2 matrix comprise a color filter of a same color or a quad square Bayer pattern array in which pixels arranged in a 4×4 matrix comprise a color filter of a same color.

The processor may be further configured to generate, based on the input image received from the image sensor, an A parallax image, a B parallax image, a C parallax image, and a D parallax image, where the plurality of neighboring pixels sharing the one micro lens include four pixels, and where the A parallax image corresponds to a combination of data values of pixels arranged in a second quadrant, the B parallax image corresponds to a combination of data values of pixels arranged in a first quadrant, the C parallax image corresponds to a combination of data values of pixels arranged in a third quadrant, and the D parallax image corresponds to a combination of data values of pixels arranged in a fourth quadrant.

The quad Bayer pattern array or the quad square Bayer pattern array may include a GRBG pattern including red pixels in a first quadrant of a first unit pixel, green pixels in a second quadrant and a fourth quadrant of the first unit pixel, and blue pixels in a third quadrant of the first unit pixel, or an RGGB pattern including green pixels in a first quadrant and a third quadrant of a second unit pixel, red pixels in a second quadrant of the second unit pixel and blue pixels in a fourth quadrant of the second unit pixel.

The quad Bayer pattern array or the quad square Bayer pattern array may include the GRBG pattern, where the first parallax image group includes the A parallax image and the D parallax image, wherein the second parallax image group includes the B parallax image and the C parallax image, and where a color shift of the first parallax image group is less than a color shift of the second parallax image group.

The quad Bayer pattern array or the quad square Bayer pattern array may include the RGGB pattern, where the first parallax image group includes the B parallax image and the C parallax image, where the second parallax image group includes the A parallax image and the D parallax image, and where a noise level of the first parallax image group is less than a noise level of the second parallax image group.

The image obtaining apparatus may be configured to operate in a low power mode, and the processor may be configured to perform the at least one image processing operation on only the second parallax image group in the low power mode.

The at least one image processing operation may include at least one of color shading correction, color shifting correction, and noise correction.

The at least one image processing operation may include the color shading correction and the color shifting correction, and the processor may be configured to perform the color shading correction and the color shifting correction by aligning a red channel and a blue channel based on a green channel of the first parallax image group.

The at least one image processing operation may include white balancing on the input image and the processor may be configured to perform the white balancing on the input image by applying the same parameters by group to the first parallax image group and the second parallax image group.

In a binning mode, the processor may be further configured to generate, by unit pixel, a first combination image by combining the A parallax image and the D parallax image, the A parallax image and the D parallax image being of a same color, generate, after performing a color shifting correction on the B parallax image and the C parallax image, a second combination image by combining the B parallax image and the C parallax image, the B parallax image and the C parallax image being of a same color, and perform a weighted summation on the first combination image and the second combination image.

The processor may be further configured to generate the output image by combining the A parallax image, the B parallax image, the C parallax image, and the D parallax image, and wherein the A parallax image, the B parallax image, the C parallax image, and the D parallax image are image-processed by group.

The similar image characteristics may include at least one of a noise level, a color shift, and a color shading.

According to an aspect of the disclosure, a method of obtaining an image by an image obtaining apparatus including an image sensor including a plurality of neighboring pixels sharing a micro lens, may include: generating, based on an input image received from the image sensor, a plurality of parallax images having a same parallax, grouping, from among the plurality of parallax images, first parallax images having similar image characteristics, performing at least one image processing operation on the first parallax images, generating an output image by combining the first parallax images on which the at least one image processing operation is performed.

The first parallax images may include a first parallax image group and a second parallax image group, and the performing the at least one image processing operation on the first parallax images may include performing image processing on the first parallax image group and the second parallax image group using context switching.

The first parallax images may include a first parallax image group and a second parallax image group, the at least one image processing operation may include a white balancing operation, and the performing the at least one image processing operation may include performing white balancing on the input image by applying the same parameters by group to the first parallax image group and the second parallax image group.

The similar image characteristics may include at least one of a noise level, a color shift, and a color shading.

According to an aspect of the disclosure, a non-transitory, computer-readable storage medium storing instructions that, when executed by at least one processor, cause the at least one processor to generate, based on an input image received from an image sensor, a plurality of parallax images having a same parallax, group, from among the plurality of parallax images, first parallax images having similar image characteristics, perform at least one image processing operation on the first parallax images, and generate an output image by combining the first parallax images on which the at least one image processing operation is performed.

The first parallax images may include a first parallax image group and a second parallax image group, and the instructions, when executed, may further cause the at least one processor to perform the at least one image processing operation on the first parallax images by performing image processing on the first parallax image group and the second parallax image group using context switching.

The instructions, when executed, may further cause the at least one processor to generate, based on the input image received from the image sensor, an A parallax image, a B parallax image, a C parallax image, and a D parallax image, and wherein the A parallax image corresponds to a combination of data values of pixels arranged in a second quadrant, the B parallax image corresponds to a combination of data values of pixels arranged in a first quadrant, the C parallax image corresponds to a combination of data values of pixels arranged in a third quadrant, and the D parallax image corresponds to a combination of data values of pixels arranged in a fourth quadrant.

The at least one image processing operation may include at least one of color shading correction, color shifting correction, and noise correction.

The at least one image processing operation may include white balancing on the input image, and the instructions, when executed, may further cause the at least one processor to perform the white balancing on the input image by applying the same parameters by group to the first parallax image group and the second parallax image group.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
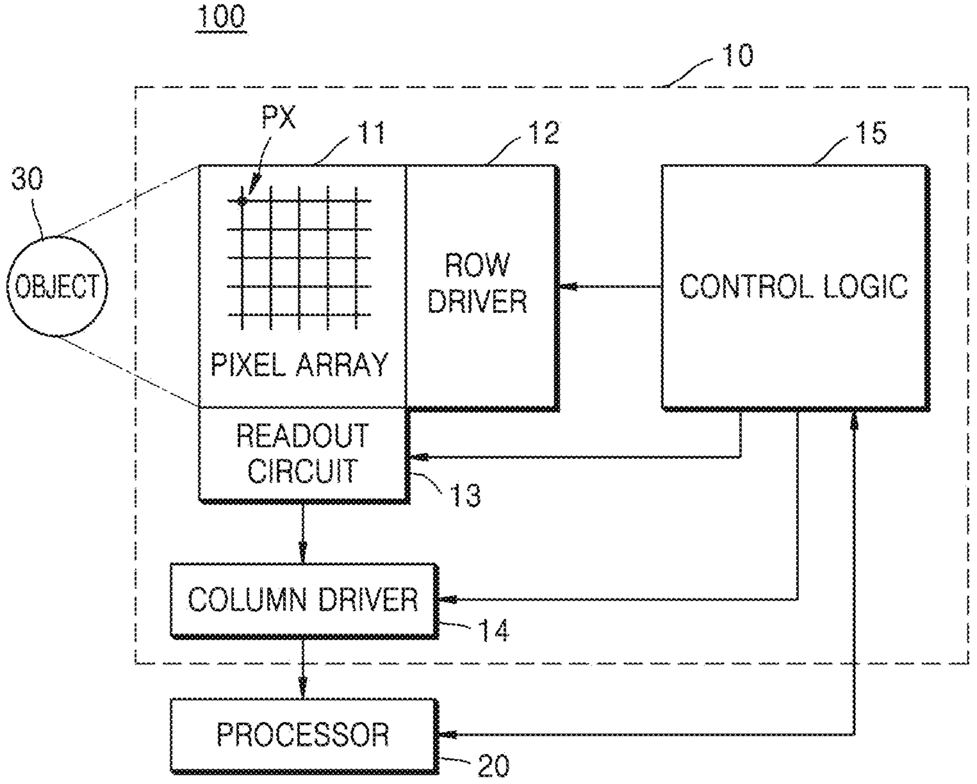
FIG. 1 is a diagram illustrating an image obtaining apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, embodiments are described in detail with reference to the accompanying drawings. In the drawings, like reference numerals in the drawings denote like elements, and sizes of components in the drawings may be exaggerated for clarity and convenience of explanation. Embodiments described below are provided only as an example, and thus can be embodied in various forms.

It will be understood that when a component is referred to as being "on" another component or on "upper part" of another component, the component can be directly on the other component or over the other component in a non-contact manner. An expression used in the singular encompasses the expression of the plural, unless it has a clearly different meaning in the context. When a portion "includes" an element, another element may be further included, rather than excluding the existence of the other element, unless otherwise described. The use of the terms "a" and "an" and "the" and similar referents in the context of describing embodiments (especially in the context of the following claims) are to be construed to cover both the singular and the plural.

Some of embodiments are described in relation to functional blocks, portions, and/or modules by referring to the attached drawings. A person skilled in the art may understand that such blocks, portions, and/or modules are physically implemented by a logic circuit, an individual component, a microprocessor, a hardwire circuit, a memory device, a wiring connection, and other electronic circuits. This may be formed using a semiconductor-based manufacturing technologies or other manufacturing technologies. In the case of blocks, portions, and/or modules implemented by a microprocessor or other similar hardware, these blocks, portions, and/or modules may be programmed and controlled using software to perform various functions discussed in the disclosure and may be operated by firmware and/or software. In addition, each block, portion, and/or module may be implemented by a dedicated hardware or may be implemented by a combination of a dedicated hardware performing some functions and a processor configured to perform different functions than the foregoing function (for example, at least one programmed microprocessor and an associated circuit). In some embodiments, blocks, portions, and/or modules may be physically separated into two or more cooperating individual blocks, portions, and/or modules without departing from the conceptual scope of the disclosure. Moreover, in some embodiments, blocks, portions, and/or modules may be physically combined into more complex blocks, portions, and/or modules without departing from the conceptual scope of the disclosure.

FIG. 1 is a diagram illustrating an image obtaining apparatus according to an embodiment.

Referring to FIG. 1, an image obtaining apparatus 100 according to an embodiment may include an image sensor 10 configured to convert an optical image formed in a photographing lens portion configured to concentrate light reflected from an object 30 to form an optical image, into an electric signal to obtain an image signal by color and a processor 20 configured to process the image signal by color obtained from the image sensor 10 and generate an output image.

The image sensor 10 may include a pixel array 11, a row driver 12, a readout circuit 13, a column driver 14, a control logic 15, etc. The row driver 12, the readout circuit 13, the column driver 14, and the control logic 15 may be circuits for generating image data for controlling the pixel array 11 and may be included in a controller.

The image sensor 10 may generate an input image (or raw data) by converting light transmitted from the object 30 into an electric signal. The input image may be output to the processor 20. The processor 20 may include an image signal processor (ISP) configured to generate an output image using an input image. According to embodiments, the image signal processor may be provided in the image sensor 10.

The pixel array 11 included in the image sensor 10 may include a plurality of pixels PX, and the plurality of pixels PX may include a photoelectric device (for example, a photo diode) configured to receive light to generate charges. In an embodiment, each of the plurality of pixels PX may include two or more photoelectric devices. Each of the pixels PX may generate a pixel signal corresponding to light of various wavelength bands, or two or more photoelectric devices may be included in each of the pixels PX to provide an auto focus (AF) function.

Each of the plurality of pixels PX may include pixel circuits for generating pixel signals from charges generated by the photo diodes. In an embodiment, the pixel circuit may include a transfer transistor, a drive transistor, a select transistor, a reset transistor, etc. For example, the pixel circuit may output a reset voltage and a pixel voltage using charges generated by the photo diodes. The pixel voltage may be a voltage to which charges generated by the photo diodes included in each of the plurality of pixels PX are reflected. In an embodiment, two or more neighboring pixels PX may constitute a pixel group, and two or more pixels PX included in a pixel group may share at least some of a transfer transistor, a drive transistor, a select transistor, and a reset transistor.

The row driver 12 may drive the pixel array 11 on a row basis. For example, the row driver 12 may generate a transfer control signal for controlling a transfer transistor of a pixel circuit, a reset control signal for controlling a reset transistor, a select control signal for controlling a select transistor, etc.

The readout circuit 13 may include a correlated double sampler (CDS), an analog-digital converter (ADC), etc. The CDS may be connected through column lines to pixels PX included in a row line selected by a row select signal provided by the row driver 12 and detect a reset voltage and a pixel voltage by performing correlated double sampling. The ADC may convert the reset voltage and the pixel voltage detected by the CDS into a digital signal and output the same.

The column driver 14 may include a latch circuit, a buffer, an amplifier circuit, etc., and the processor 20 may store or amplify a digital signal received from the readout circuit 13 to generate image data. The timing of operations of the row driver 12, the readout circuit 13, and the column driver 14 may be determined by the control logic 15, and the control logic 15 may be operated according to a control command transmitted by the processor 20. The processor 20 may signal process an input image output by the column driver 14 or the control logic 15 to generate an output image and output the output image to a display device, etc., or store the same in a memory, etc.

Figure 2:
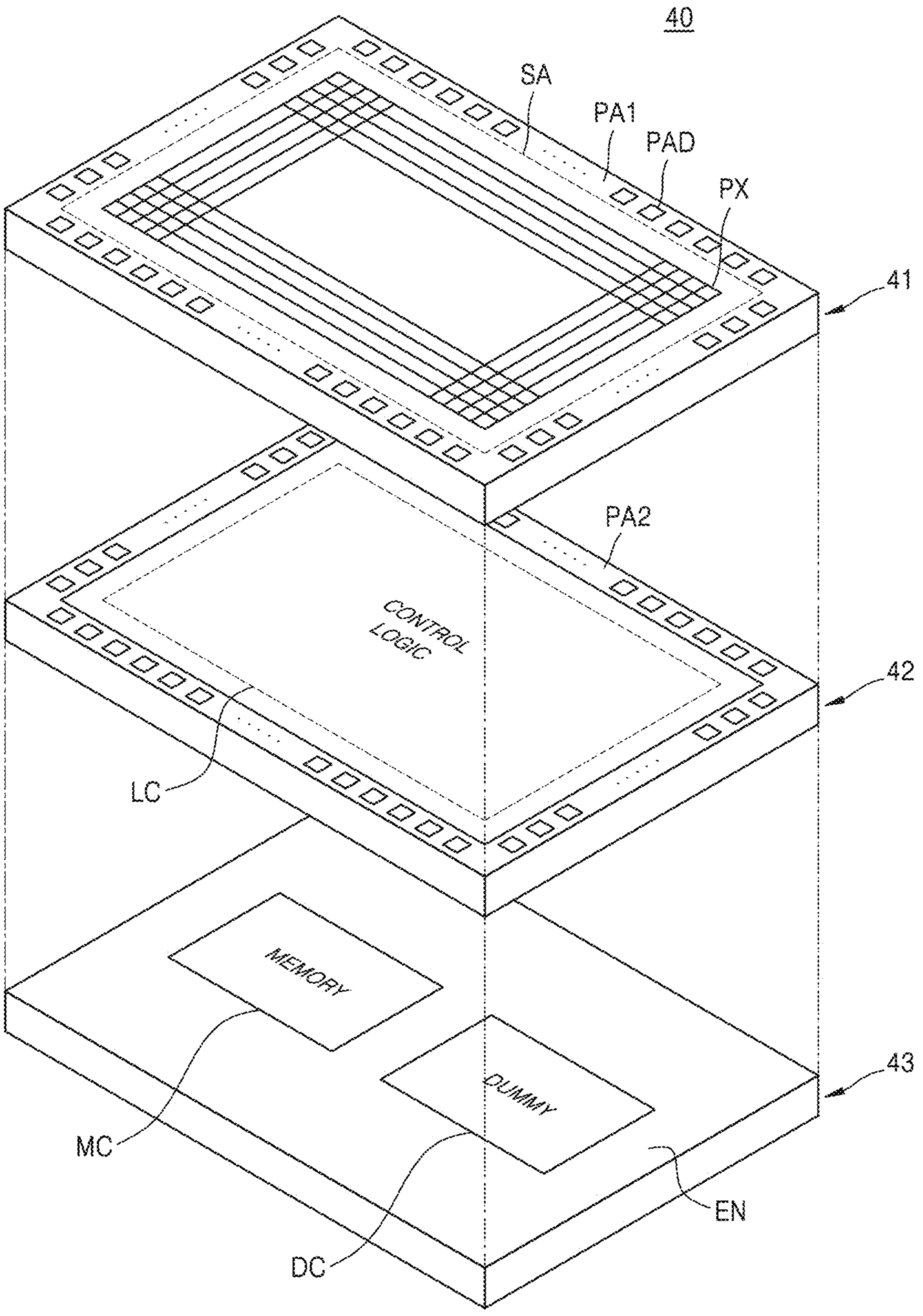
FIGS. 2 and 3 are diagrams illustrating an image sensor according to an embodiment.
Figure 3:
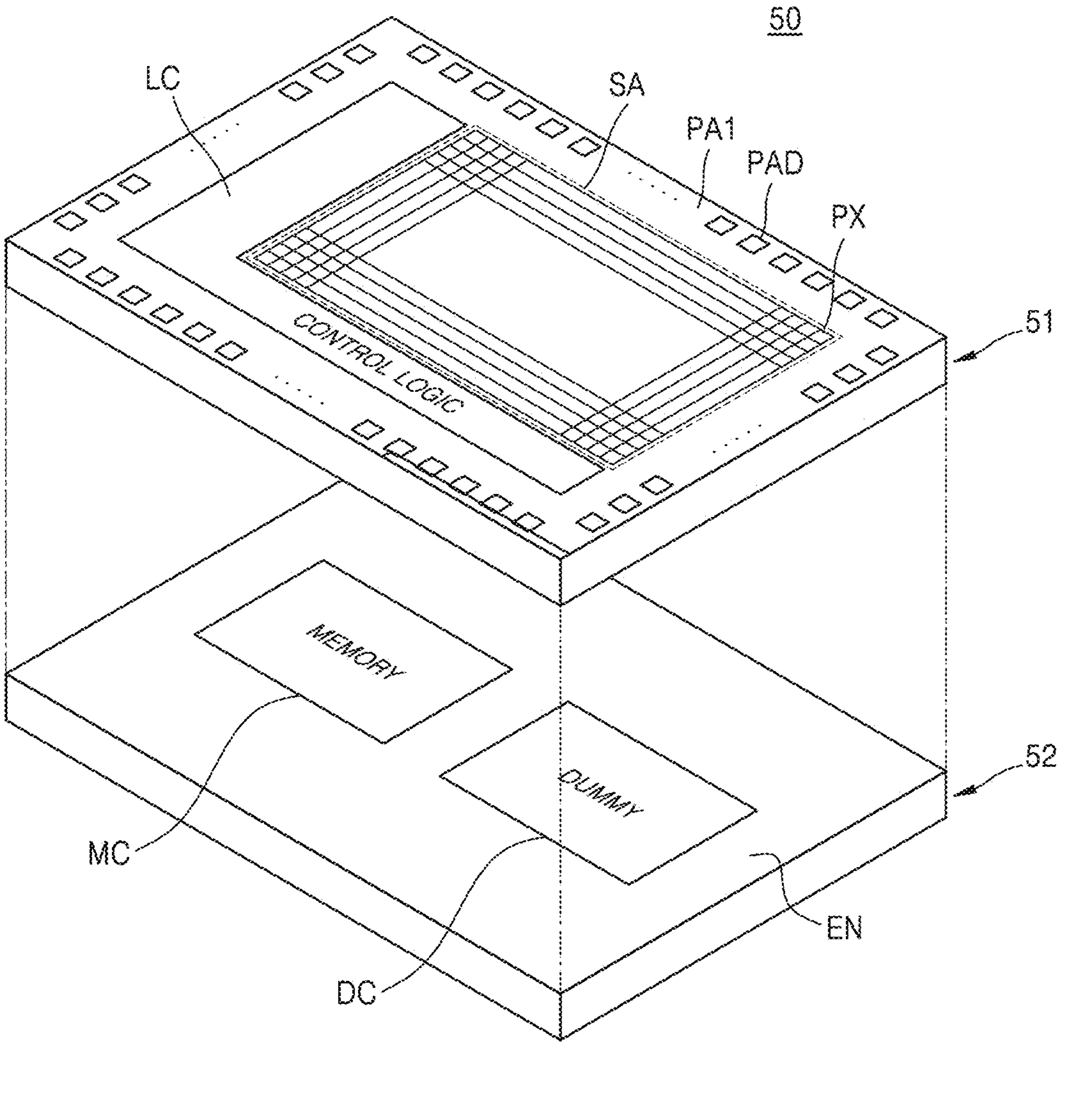

FIGS. 2 and 3 are diagrams illustrating an image sensor according to an embodiment.

Referring to FIG. 2, an image sensor 40 according to an embodiment may include a first layer 41, a second layer 42 provided under the first layer 41, a third layer 43 provided under the second layer 42, etc. The first layer 41, the second layer 42, and the third layer 43 may be stacked in the vertical direction. In an embodiment, the first layer 41 and the second layer 42 may be stacked at a wafer level, and the third layer 43 may be attached under the second layer 42 at a chip level. The first to third layers 41, 42, and 43 may be provided as one semiconductor package.

The first layer 41 may include a sensing area SA in which a plurality of pixels PX are provided and a first pad area PA1 provided at the periphery of the sensing area SA. The first pad area PA1 may include a plurality of upper pads PAD, and the plurality of upper pads PAD may be connected to pads provided in a second pad area PA2 of the second layer 42 and a logic circuit LC through a via, etc.

Each of the plurality of pixels PX may include a photo diode configured to receive light and generate charges, a pixel circuit configured to process the charges generated by the photo diode, etc. The pixel circuit may include a plurality of transistors for outputting voltages corresponding to the charges generated by the photo diode.

The second layer 42 may include a plurality of elements providing the logic circuit LC. The plurality of elements included in the logic circuit LC may provide circuits for driving the pixel circuit of the first layer 41 (for example, the row driver 12, the readout circuit 13, the column driver 14, the control logic 15, etc. illustrated in FIG. 1). According to an embodiment, when the processor 20 is provided in the image sensor 10, the processor 20 may be included in the logic circuit LC of the second layer 42. The plurality of elements included in the logic circuit LC may be connected to the pixel circuit through the first and second pad areas PA1 and PA2. The logic circuit LC may obtain a reset voltage and a pixel voltage from the plurality of pixels PX and generate a pixel signal.

In an embodiment, at least one of the plurality of pixels PX may include a plurality of photo diodes arranged at the same level. Pixel signals generated from charges of each of a plurality of photo diodes may have a phase difference with each other, and the logic circuit LC may provide the AF function based on the phase difference among the pixel signals generated from the plurality of photo diodes included in one pixel PX.

The third layer 43 arranged under the second layer 42 may include a memory chip MC, a dummy chip DC, and a protective layer EN sealing the memory chip MC and the dummy chip DC. The memory chip MC may be dynamic random access memory (RAM) (DRAM) or static RAM (SRAM), and the dummy chip DC may not actually have the data storing function. The memory chip MC may be electrically connected to at least some of the elements included in the logic circuit LC of the second layer 42 by a bump and store information required to provide the AF function. In an embodiment, the bump may be a micro bump.

Referring to FIG. 3, an image sensor 50 according to an embodiment may include a first layer 51 and a second layer 52. The first layer 51 may include a sensing area SA in which a plurality of pixels PX are provided, a logic circuit LC in which elements for driving the plurality of pixels PX, and a first pad area PA1 provided at the periphery of the sensing area SA and the logic circuit LC. According to an embodiment, when the processor 20 is provided in the image sensor 10, the processor 20 may be included in the logic circuit LC of the first layer 51. The first pad area PA1 may include a plurality of upper pads PAD, and the plurality of upper pads PAD may be connected to a memory chip MC provided in the second layer 52 through a via, etc. The second layer 52 may include the memory chip MC, a dummy chip DC, and a protective layer EN sealing the memory chip MC and the dummy chip DC.

Figure 4:
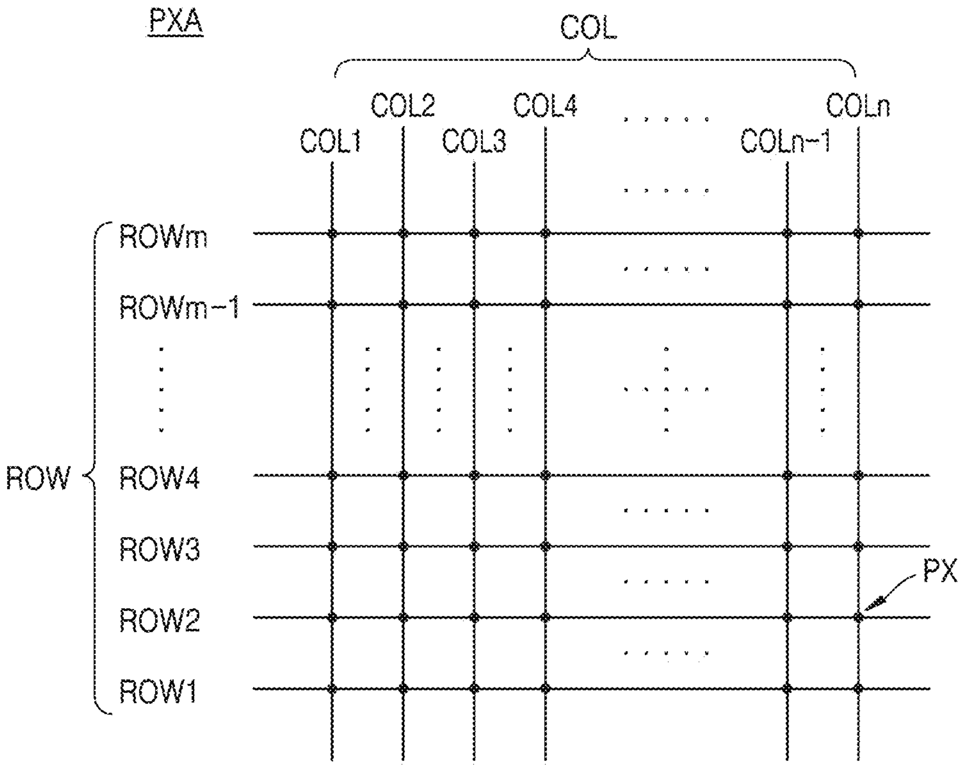
FIG. 4 is a diagram illustrating a pixel array of an image sensor according to an embodiment.

FIG. 4 is a diagram illustrating a pixel array of an image sensor according to an embodiment.

Referring to FIG. 4, a pixel array PXA of an image sensor according to an embodiment may include a plurality of pixels PX. The plurality of pixels PX may be connected to a plurality of row lines ROW1 to ROWm (ROW) and a plurality of column lines COL1 to COLn (COL). The image sensor may drive the plurality of pixels PX on a row line ROW basis. For example, a time required to drive a select drive line among the plurality of row lines ROW and read a reset voltage and a pixel voltage from pixels PX connected to the select drive line may be defined as a horizontal period. The image sensor may operate by a rolling shutter method in which the plurality of pixels PX are sequentially exposed to light or a global shutter method in which the plurality of pixels PX are simultaneously exposed to light.

A reset voltage and a pixel voltage output from each of the plurality of pixels PX may be converted into digital data and then may be processed into an input image through signal processing. The image signal processor provided in the image sensor or provided in separate processor communicating with the image sensor may generate a resultant image displayed on a display or stored in a memory using the input image. Accordingly, depending on the performance of the image signal processor, tuning method, etc., different resultant images may be generated from the same input image.

When a number of pixels PX included in an image sensor are increased, a high-resolution image sensor may require more logics and memories to perform image processing.

Accordingly, by minimizing logics and memories required to perform image processing, time and expense for image processing may be reduced.

The pixel array PXA may include a plurality of pixels configured to sense light of different wavelengths. The arrangement of the pixels may be implemented in various ways. For example, FIGS. 5A and 5B illustrate various arrangements of the pixel array PXA.

Figure 5A:
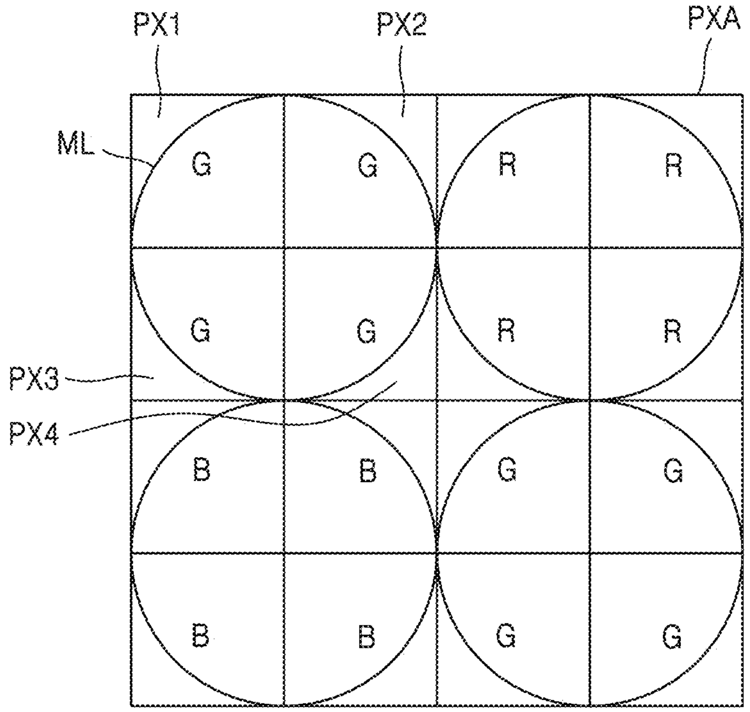
FIG. 5A is a plan view illustrating a region of a quad Bayer pattern according to an embodiment.
Figure 5B:
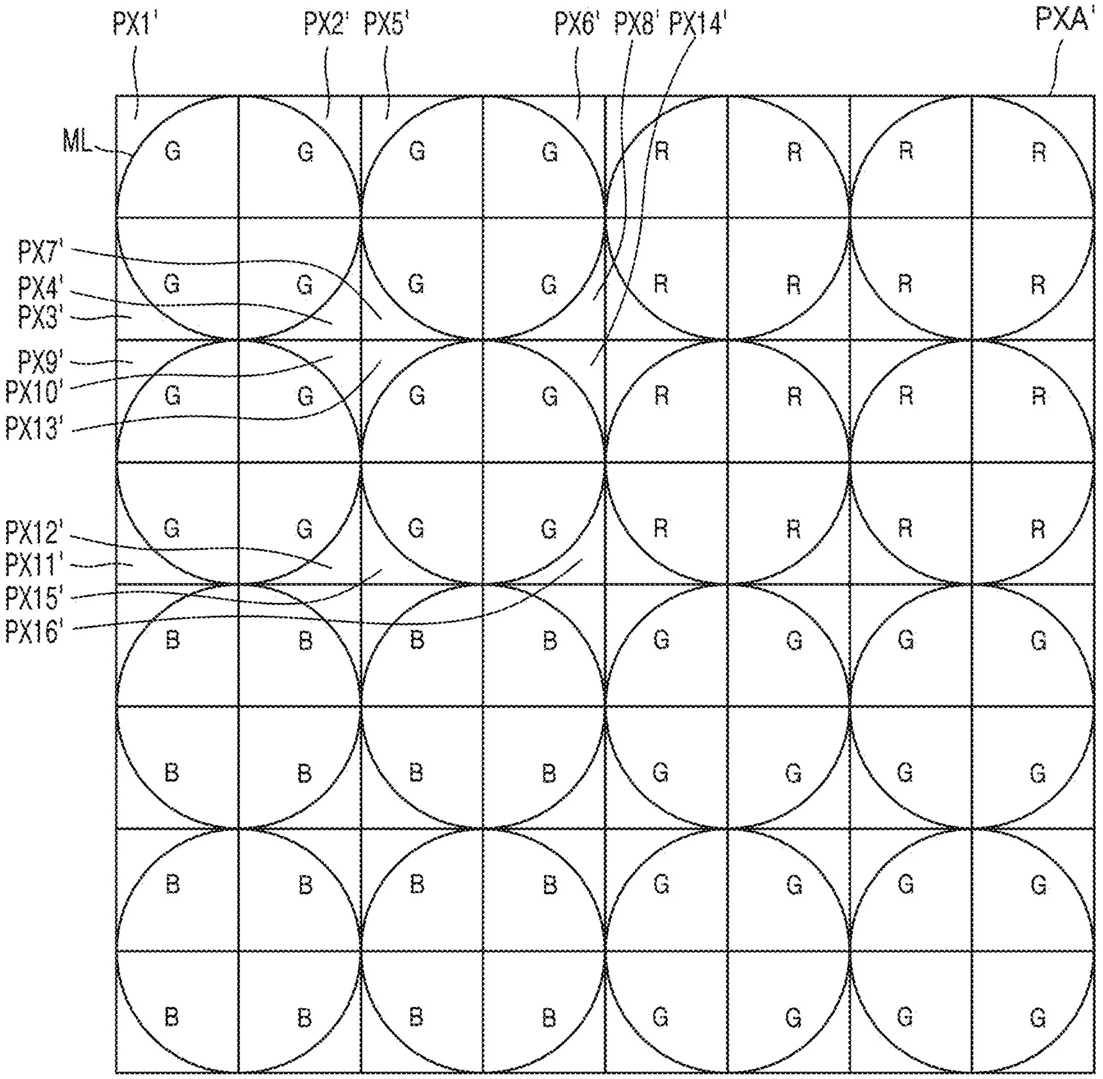
FIG. 5B is a plan view illustrating a region of a quad square Bayer pattern according to an embodiment.
Figure 5C:
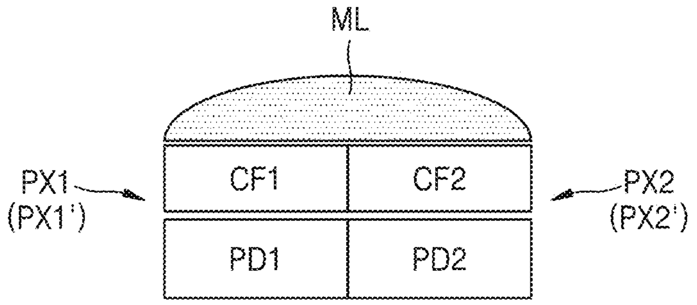
FIG. 5C is a cross-sectional view illustrating a region of a pixel array illustrated in FIGS. 5A and 5B according to an embodiment.

FIG. 5A is a plan view illustrating a region of a quad Bayer pattern according to an embodiment. FIG. 5B is a plan view illustrating a region of a quad square Bayer pattern according to an embodiment. FIG. 5C is a cross-sectional view illustrating a region of a pixel array illustrated in FIGS. 5A and 5B according to an embodiment.

Referring to FIGS. 5A and 50, the pixel array PXA may have a quad Bayer pattern structure. 4 pixels arranged in a 2×2 array (including 2 rows and 2 columns) may include a color filter of a same color. Accordingly, in the pixel array P×A, 4×4 pixels may include green pixels G in a 2×2 array, red pixels R in a 2×2 array, blue pixels B in a 2×2 array, and green pixels G in a 2×2 array.

Each of the pixels included in the pixel array PXA may include a color filter and a light receiving element (e.g., photo diode). For example, a first pixel PX1 may include a first color filter CF1 and a first light receiving element PD1, and a second pixel PX2 may include a second color filter CF2 and a second light receiving element PD2. The first color filter CF1 and the second color filter CF2 may be of a same color (e.g., green).

The first pixel PX1, the second pixel PX2, a third pixel PX3, and a fourth pixel PX4 may be arranged adjacent to each other and share one micro lens ML. The micro lens ML may have a convex shape to concentrate light incident onto unit pixels (e.g., the first pixel PX1, the second pixel PX2, the third pixel PX3, and the fourth pixel PX4). The micro lens ML may have a hemispherical cross-section. In a plan view, the micro lens ML have a circular shape.

Referring to FIGS. 5B and 5C, a pixel array PXA' may have a quad square Bayer pattern structure. 16 pixels arranged in a 4×4 array (including 4 rows and 4 columns) may include a color filter of a same color. Accordingly, in the pixel array PXA', 8×8 pixels may include green pixels G in a 4×4 array, red pixels R in a 4×4 array, blue pixels B in a 4×4 array, and green pixels G in a 4×4 array.

Each of the pixels included in the pixel array PXA' may include a color filter and a light receiving element (e.g., photo diode). For example, a first pixel PX1' may include a first color filter CF1 and a first light receiving element PD1, and a second pixel PX2' may include a second color filter CF2 and a second light receiving element PD2. The first color filter CF1 and the second color filter CF2 may be of a same color (e.g., green).

The first pixel PX1' to a sixteenth pixel PX16' may be arranged adjacent to each other, and each of the first pixel PX1' to a fourth pixel PX4', a fifth pixel PX5' to an eighth pixel PX8', a ninth pixel PX9' to twelfth pixel PX12', and a thirteenth pixel PX13' to a sixteenth pixel PX16' may share one micro lens ML. The micro lens ML may have a convex shape to concentrate light incident onto unit pixels (e.g., the first pixel PX1', the second pixel PX2', the third pixel PX3', and the fourth pixel PX4'). The micro lens ML may have a hemispherical cross-section. In a plan view, the micro lens ML have a circular shape. By including the micro lens ML, the sensitivity of the image sensor 200 may be improved. That is, optical characteristics of the image sensor 200 may be improved.

Figure 6A:
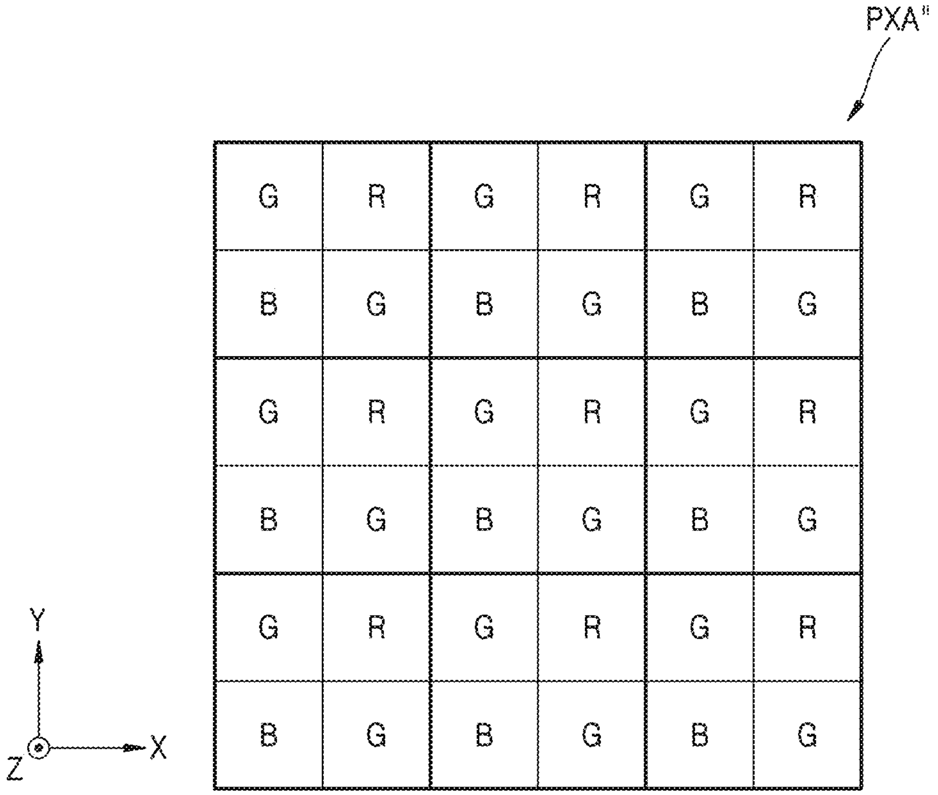
FIG. 6A is a plan view illustrating color arrangement represented by a pixel array of an image sensor according to an embodiment.
Figure 6B:
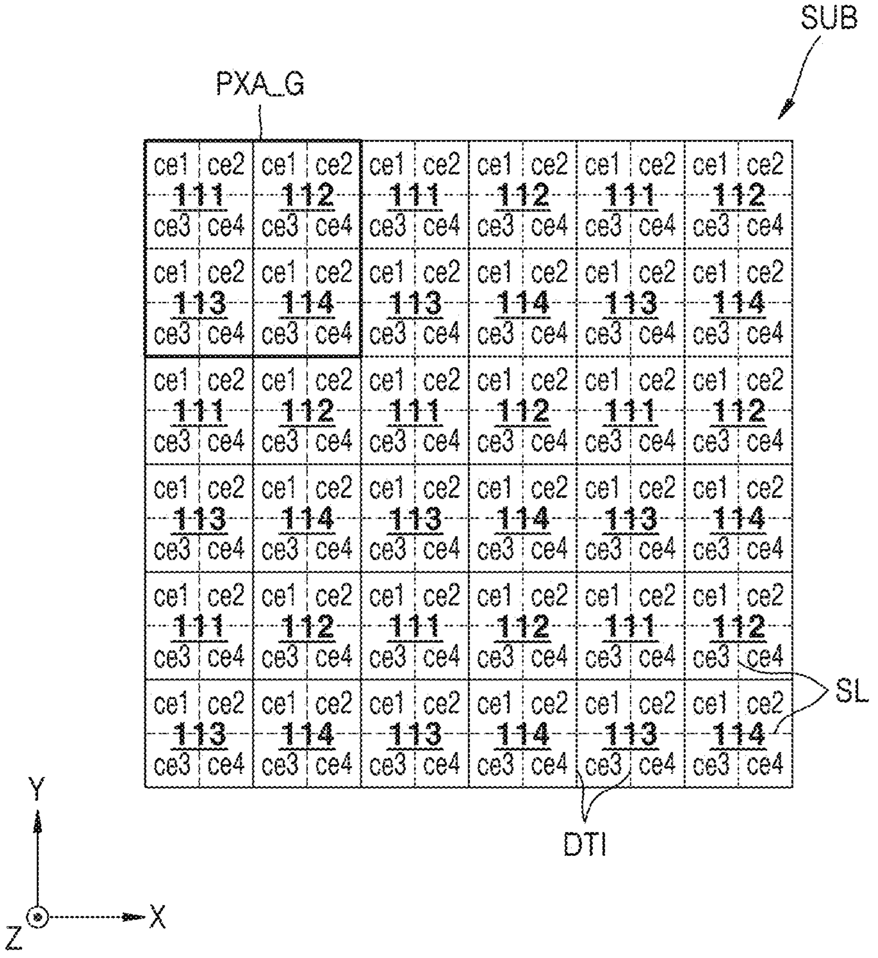
FIGS. 6B and 6C are plan views illustrating a metal prism array and a sensor substrate provided in a pixel array of an image sensor illustrated in FIG. 6A, according to an embodiment.
Figure 6C:
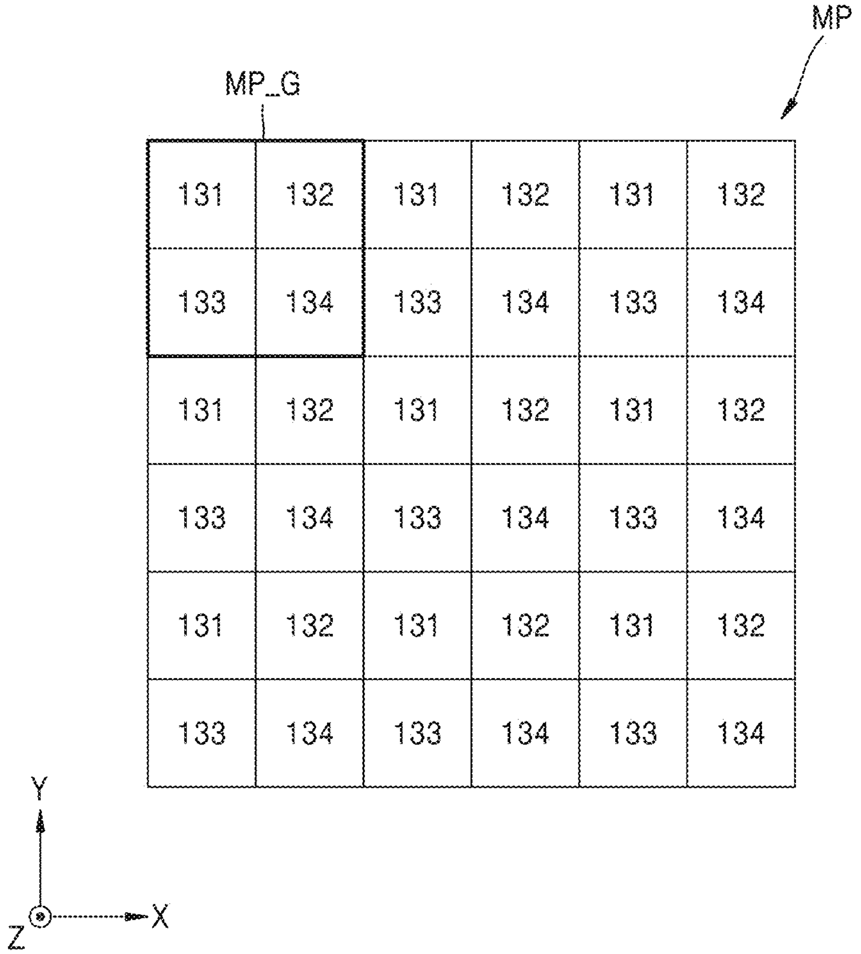

FIG. 6A is a plan view illustrating color arrangement represented by a pixel array of an image sensor according to an embodiment. FIGS. 6B and 6C are plan views illustrating a metal prism array and a sensor substrate provided in a pixel array of an image sensor illustrated in FIG. 6A according to an embodiment.

The color arrangement illustrated in FIG. 6A is a Bayer pattern arrangement. As shown in FIG. 6A, a unit pattern may include four quadrants, and first to fourth quadrants may represent red (R), green (G), blue (B), and green (G), respectively. Such a unit pattern may be repeatedly arranged in a two-dimensional (2D) manner in a first direction (X direction) and a second direction (Y direction). For such a color arrangement, two green pixels may be arranged in one diagonal direction in a unit pattern of a 2×2 array, and one blue pixel and one red pixel may be arranged in another diagonal direction. In other words, a first row in which a plurality of green pixels and a plurality of blue pixels are alternately arranged in the first direction and a second row in which a plurality of red pixels and a plurality of green pixels are alternately arranged in the first direction may be repeatedly arranged.

Although an example in which a pixel array PXA" of the image sensor 200 has a Bayer pattern is described below, the operational principle may be applied to various pixel arrangements other than the Bayer pattern (e.g., quad Bayer pattern, quad square Bayer pattern, etc.)

The pixel array PXA" of the image sensor 200 may include a color separation lens array corresponding to such a color arrangement (i.e., concentrating light having a color corresponding to a particular pixel).

Referring to FIG. 6B, a sensor substrate SUB may include a plurality of pixels sensing incident light. The sensor substrate SUB may include a plurality of unit pixel groups PXA_G. The unit pixel group PXA_G may include a first sub pixel group 111, a second sub pixel group 112, a third sub pixel group 113, and a fourth sub pixel group 114, each configured to convert incident light into an electric signal and generate an image signal. The unit pixel group PXA_G may have a Bayer pattern pixel arrangement. That is, the first sub pixel group 111 and the fourth sub pixel group 114 may include green pixels sensing green light, the second sub pixel group 112 may include a red pixel sensing red light, and the third sub pixel group 113 may include a blue pixel sensing blue light. The first to fourth sub pixel groups 111, 112, 113, and 114 may each independently include a plurality of light sensing cells sensing incident light. For example, each of the first to fourth sub pixel groups 111, 112, 113, and 114 may include first to fourth light sensing cells ce1, ce2, ce3, and ce4. The first to fourth light sensing cells ce1, ce2, ce3, and ce4 may be arranged in a 2D manner in the first direction (X direction) and the second direction (Y direction). For example, the first to fourth light sensing cells ce1, ce2, ce3, and ce4 may be arranged in a 2×2 array in each of the first to fourth sub pixel groups 111, 112, 113, and 114.

Although FIG. 6B illustrates that each of the first to fourth sub pixel groups 111, 112, 113, and 114 includes four light sensing cells, four or more independent light sensing cells may be grouped and arranged in a 2D manner. For example, each of the first to fourth sub pixel groups 111, 112, 113, and 114 may include a plurality of independent light sensing cells arranged in a 4×4 array as the pixel array PXA' of the image sensor illustrated in FIG. 5B. For convenience of description, the case in which each of the first to fourth sub pixel groups 111, 112, 113, and 114 includes light sensing cells arranged in a 2×2 array will be described.

According to an embodiment, a plurality of pixels including a plurality of light sensing cells sensing light of a same color may be used as AF pixels. In the AF pixel, an AF signal may be obtained from a difference between output signals of adjacent light sensing cells. For example, an AF signal in the first direction (X direction) may be generated from a difference between an output signal of the first light sensing cell ce1 and an output signal of the second light sensing cell ce2, a difference between an output signal of the third light sensing cell ce3 and an output signal of the fourth light sensing cell ce4, or a difference between the sum of the output signals of the first light sensing cell ce1 and the third light sensing cell ce3 and the sum of the output signals of the second light sensing cell ce2 and the fourth light sensing cell ce4. In addition, an AF signal in the second direction (Y direction) may be generated from a difference between the output signal of the first light sensing cell ce1 and the output signal of the third light sensing cell ce3, a difference between the output signal of the second light sensing cell ce2 and the output signal of the fourth light sensing cell ce4, or a difference between the sum of the output signals of the first light sensing cell ce1 and the second light sensing cell ce2 and the sum of the output signals of the third light sensing cell ce3 and the fourth light sensing cell ce4.

A sum mode and a full mode may be used as a method for obtaining an image signal. In the sum mode, an image signal may be obtained by combining output signals of the first to fourth light sensing cells ce1, ce2, ce3, and ce4. For example, a first green image signal may be generated by combining output signals of the first to fourth light sensing cells ce1, ce2, ce3, and ce4 of the first sub pixel group 111, a red image signal may be generated by combining output signals of the first to fourth light sensing cells ce1, ce2, ce3, and ce4 of the second sub pixel group 112, a blue image signal may be generated by combining output signals of the first to fourth light sensing cells ce1, ce2, ce3, and ce4 of the third sub pixel group 113, and a second green image signal may be generated by combining output signals of the first to fourth light sensing cells ce1, ce2, ce3, and ce4 of the fourth sub pixel group 114. In the full mode, an output signal may be obtained individually from each of the first to fourth light sensing cells ce1, ce2, ce3, and ce4. In this case, a high-resolution image may be obtained.

The first to fourth light sensing cells ce1, ce2, ce3, and ce4 may be electrically isolated by an isolation structure DTI. The isolation structure DTI may include a deep trench isolation structure. The deep trench may be filled with an electrically insulating material. After forming a light sensing layer, by forming the isolation structure DTI on the light sensing layer, a plurality of cells which are electrically isolated may be formed. The isolation structure DTI may electrically isolate the first to fourth sub pixel groups 111, 112, 113, and 114, and may electrically isolate each of the first to fourth sub pixel groups 111, 112, 113, and 114 into four regions. A separation line SL in a cross shape indicates a center line of the isolation structure DTI, included in each of the first to fourth sub pixel groups 111, 112, 113, and 114, and isolating each of the first to fourth sub pixel groups 111, 112, 113, and 114 into the first to fourth light sensing cells ce1, ce2, ce3, and ce4. Although the isolation structure DTI is shown in a line having a near-zero thickness for convenience of illustration, the isolation structure DTI may have a thickness physically spacing the adjacent light sensing cells. The isolation structure DTI included in the first to fourth sub pixel groups 111, 112, 113, and 114 may be an area incapable of sensing light, and accordingly, in designing a meta prism array described below, a method of reducing performance degradation due to such isolation structure may be considered.

Referring to FIG. 6C, a meta prism array MP may include a plurality of pixel groups MP_G respectively corresponding to the plurality of unit pixel groups PXA_G of the sensor substrate SUB illustrated in FIG. 6B. The pixel groups MP_G may include first to fourth areas 131, 132, 133, and 134 respectively corresponding to the first to fourth sub pixel groups 111, 112, 113, and 114. Each of the first to fourth areas 131, 132, 133, and 134 may include a plurality of nanoposts. The nanoposts may separate incident light according to a wavelength and concentrate the separated light onto corresponding first to fourth sub pixel groups 111, 112, 113, and 114 according to the wavelength. As described above in relation to FIG. 6B, the first sub pixel group 111 and the fourth sub pixel group 114 may be a first green pixel and a second green pixel, respectively, the second sub pixel group 112 may be a red pixel, and the third sub pixel group 113 may be a blue pixel.

The shape and arrangement of the plurality of nanoposts included in the meta prism array MP may be determined to form a proper phase distribution for such separation and concentration of light by wavelength.

Figure 7:
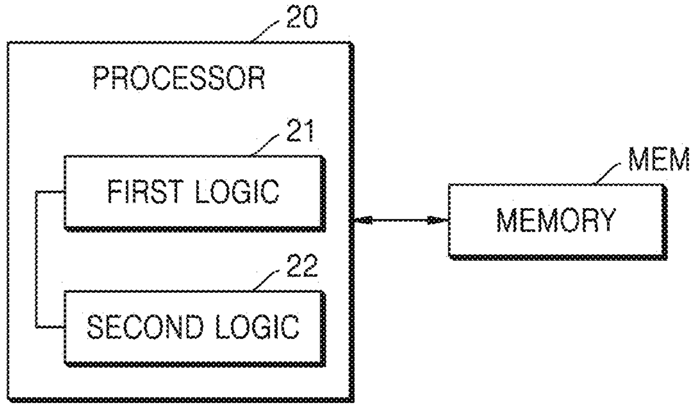
FIG. 7 is a block diagram illustrating image processing performed by a processor according to an embodiment.

FIG. 7 is a block diagram illustrating image processing performed by a processor according to an embodiment. The processor 20 may be an image signal processor configured to perform at least one image processing operation on an input image to generate an output image.

Referring to FIG. 7, the processor 20 according to an embodiment may include a first logic 21 and a second logic 22. The first logic 21 and the second logic 22 may be connected in parallel to each other and simultaneously perform the image processing (i.e., perform at least one image processing operation). The first logic 21 and the second logic 22 may image-process (or preprocess) an input image (or raw data) received from the image sensor 10. For example, each of the first logic 21 and the second logic 22 may perform the color shift correction, color shading correction, noise correction, etc., on at least a part of the input image based on image characteristics.

The first logic 21 and the second logic 22 may share one memory MEM. For example, when performing the image processing, the first logic 21 and the second logic 22 may receive the same register (or parameter) from the memory MEM. The memory MEM according to an embodiment may be DRAM or SRAM. When the processor 20 is provided in the image sensor 10 (see FIG. 1), the memory MEM may correspond to the memory chip MC illustrated in FIGS. 2 and 3.

The processor 20 may perform the image processing using a round robin method, which is a preemptive scheduling method.

The memory MEM may include a kernel memory area, a user memory area, and other memory area, etc. The kernel memory area may be accessed only in a kernel mode and store codes and data which provide key functions of an operating system, the user memory area may be accessed in a user mode and store program codes and variable stacks, etc., and other memory areas may include a memory area used in a basic input/output system (BIOS) or a memory area used in a graphic card.

More specifically, the kernel memory area may include a code area, a data area, a stack area, a heap area, a process control block area, etc. The code area is an area in which codes required for execution of kernel are stored. As the kernel is executed in the kernel memory, the code area may be designated as a read-only area. The data area may be an area in which data such as global variables, constants, etc., required when the kernel is executed are stored. The data area may be designated as a read-only area, similar to the code area. The stack area may be an area in which factors transmitted in response to a function call in the kernel, local variables, etc. are stored. The stack area may have a last-in first-out (LIFO) structure and in general, may have a limited size to prevent a stack overflow in the kernel. The heap area may be used when the kernel dynamically allocates or releases the memory. The process control block area may be a structure in which status information of each process is stored. The process control block area may be used only inside the kernel, and essentially used for operations such as generation, termination, scheduling, etc. of processes.

In the round robin method, the total operation time may be divided at an equal interval and a plurality of processes may be performed alternately. The processor 20 may store a status of a process which is currently performed in the process control block area. For example, during a first process, an ID, status value, register, etc. of the first process may be stored in the process control block area, and when the time allocated to the first process is used according to the round robin method, a subsequent second process may be performed, and an ID, status value, register, etc. of the second process may be stored in the process control block area accordingly.

In the context switching, when the allocated time for the first process is used and operations of the second process are about to be processed, an interrupt may occur before the operations of the second process are processed. That is, the context switching may refer to an operation of handing over the control of the processor 20 by storing a status of a current process in the process control block area and preloading a status of a subsequent process from the process control block area.

FIGS. 8A, 8B, 8C, and 8D are diagrams illustrating a method of performing image processing in an image obtaining apparatus including a quad Bayer pattern according to an embodiment. FIG. 9 is a diagram illustrating color shift effects occurring in a step edge according to an embodiment. For convenience of illustration, embodiments are described assuming that the image sensor 10 includes the micro lens ML in FIGS. 8A, 8B, 8C, and 8D.

Referring to FIGS. 7 to 9, the processor 20 according to an embodiment may receive an input image IMG_IN from the image sensor 10. The pixel array PXA of the image sensor 10 according to an embodiment may have a quad Bayer pattern structure. Accordingly, in the input image IMG_IN, 4×4 sub images may include 2×2 green G sub images PA, PB, PC, and PD, 2×2 red R sub images PA, PB, PC, and PD, and 2×2 green G sub images PA, PB, PC, and PD. In this regard, sub images PA, PB, PC, and PD of the same color may share one micro lens ML (or meta prism array MP) and thus include four parallaxes. That is, the sub images PA, PB, PC, and PD may have an A parallax, a B parallax, a C parallax, and a D parallax.

The processor 20 may extract and combine sub images PA, PB, PC, and PD having the same parallax from the input image IMG_IN to generate a plurality of parallax images IMG_PA, IMG_PB, IMG_PC, and IMG_PD.

An A parallax image IMP_PA may be generated by extracting and combining sub images PA, PB, PC, and PD having the A parallax in the input image IMG_IN, a B parallax image IMG_PB may be generated by extracting and combining sub images PA, PB, PC, and PD having the B parallax in the input image IMG_IN, a C parallax image IMG_PC may be generated by extracting and combining sub images PA, PB, PC, and PD having the C parallax in the input image IMG_IN, and a D parallax image IMG_PD may be generated by extracting and combining sub images PA, PB, PC, and PD having the D parallax in the input image IMG_IN.

The A parallax image IMP_PA, the B parallax image IMG_PB, the C parallax image IMG_PC, and the D parallax image IMG_PD may have a Bayer pattern structure in which a unit pixel having four quadrant regions including red pixels of a first quadrant, green pixels of a second quadrant, blue pixels of a third quadrant, and green pixels of a fourth quadrant is repeatedly arranged in a 2D manner in the first direction (e.g., transverse direction) and the second direction (e.g., longitudinal direction). Due to this, the image processing described below may be performed on the parallax images IMG_PA, IMG_PB, IMG_PC, and IMG_PD using algorithms and logics designed for Bayer pattern structures. That is, a high-quality output image IMG_OUT may be generated while minimizing logics for correcting different parallaxes of the quad Bayer pattern including the micro lens ML (or meta prism array MP), which may lead to reduced expenses.

Then, the processor 20 may group parallax images having similar characteristics among the plurality of parallax images IMG_PA, IMG_PB, IMG_PC, and IMG_PD, and perform at least one image processing operation thereon by group. The image characteristics may include noise level, color shift, and color shading of an image.

The plurality of parallax images IMG_PA, IMG_PB, IMG_PC, and IMG_PD may be grouped into a first parallax image group IMG_GR1 and a second parallax image group IMG_GR2.

Figure 8A:
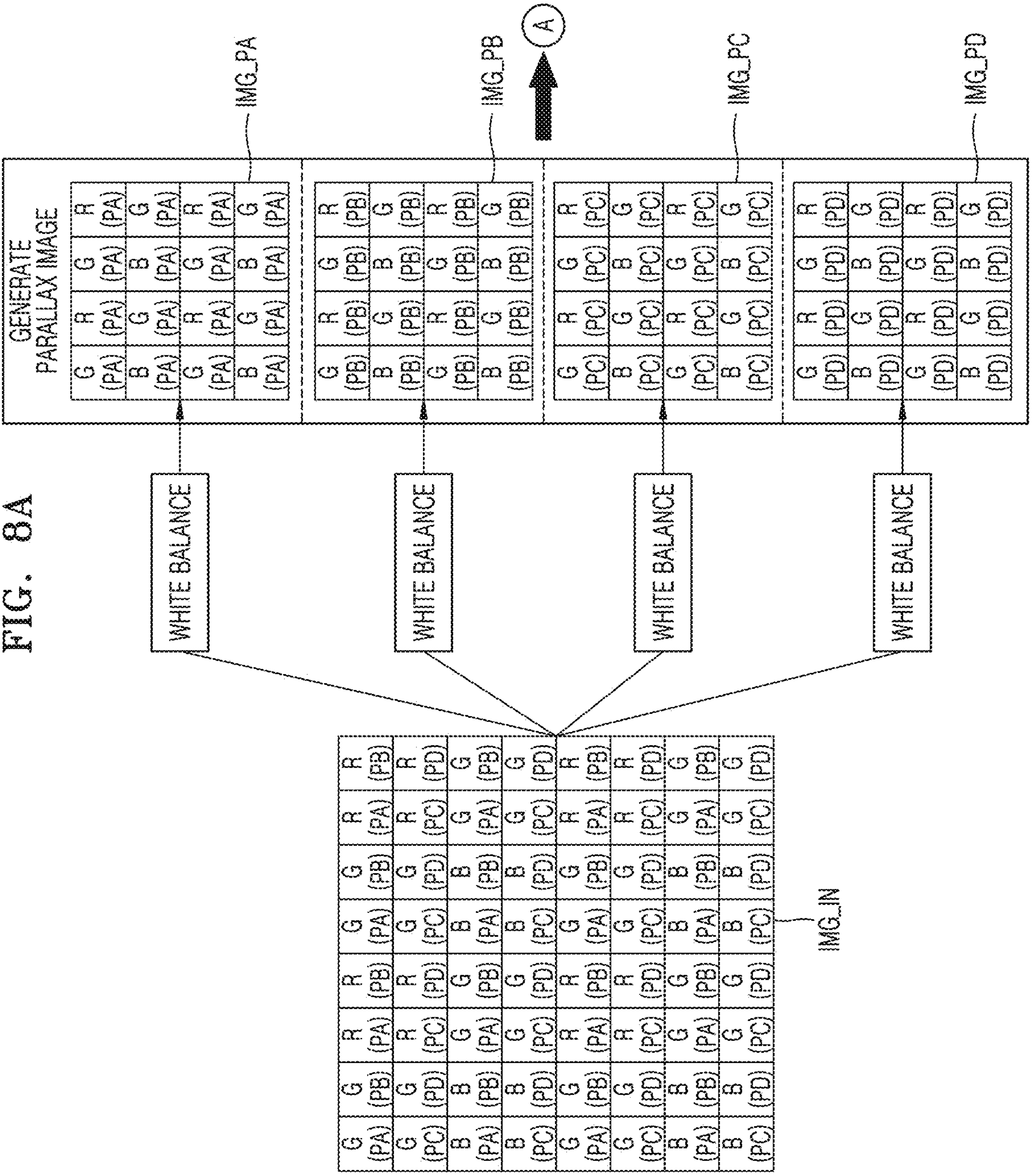
FIGS. 8A, 8B, 8C and 8D are diagrams illustrating a method of performing image processing in an image obtaining apparatus including a quad Bayer pattern according to an embodiment.
Figure 8B:
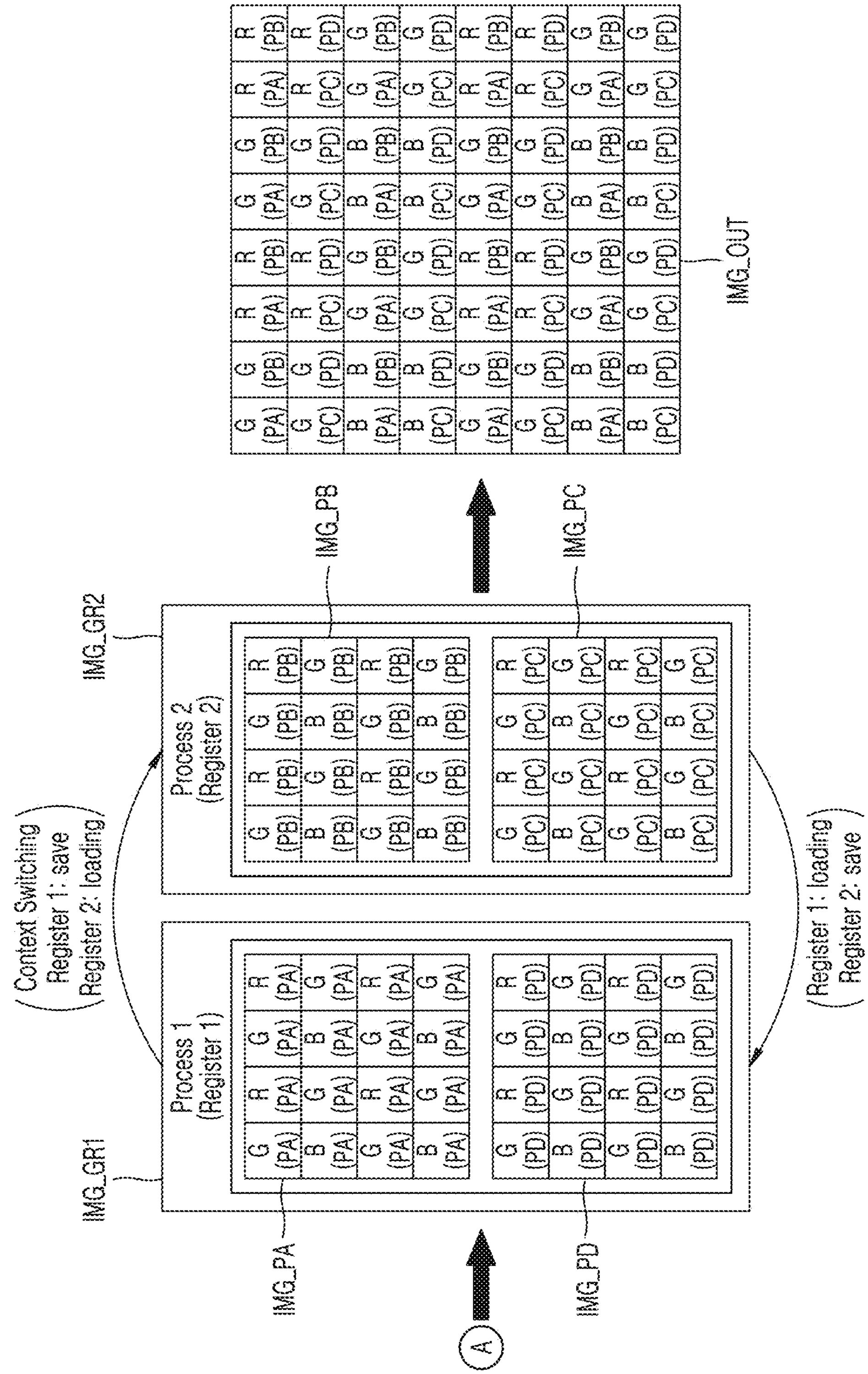
Figure 8C:
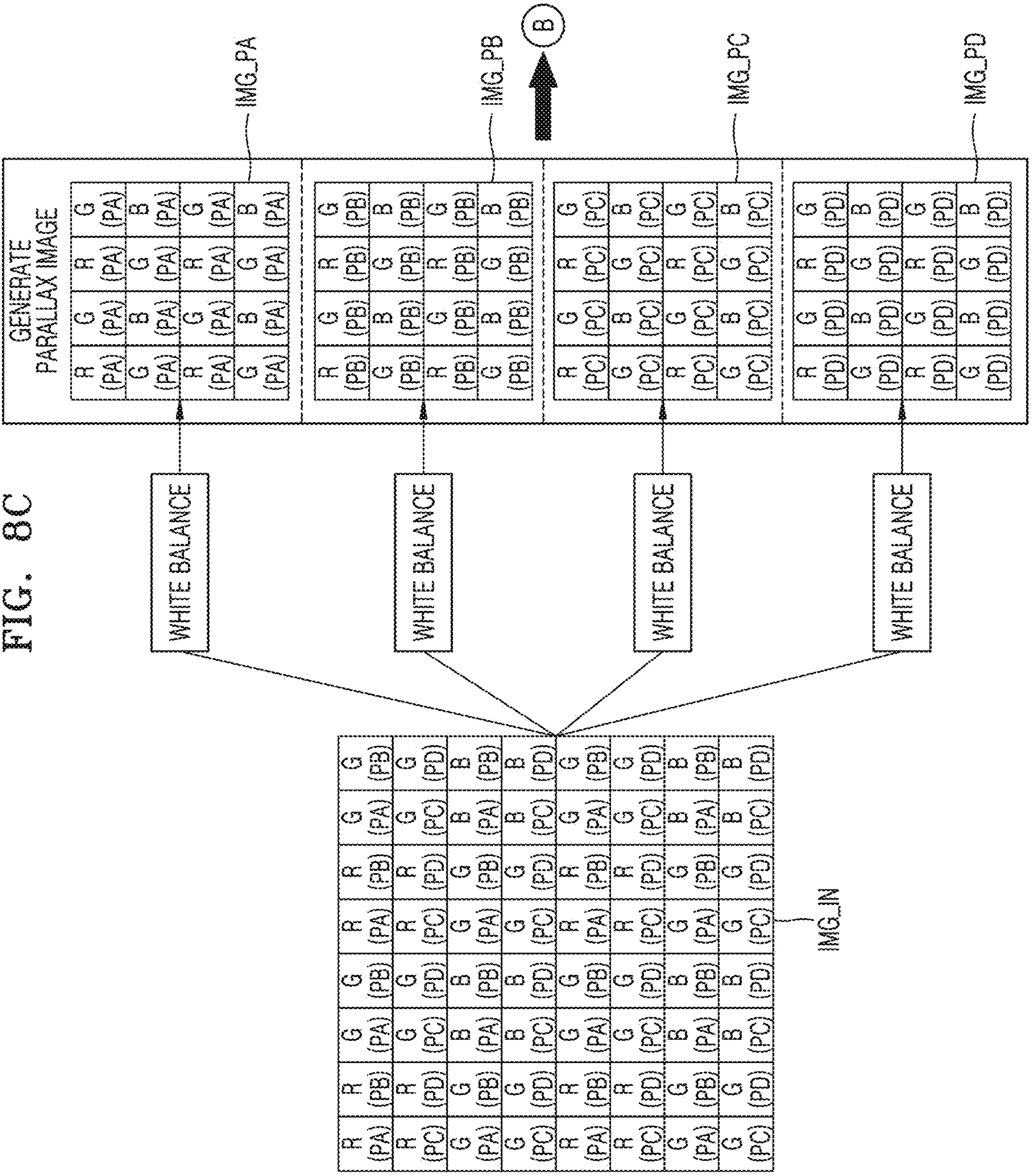
Figure 8D:
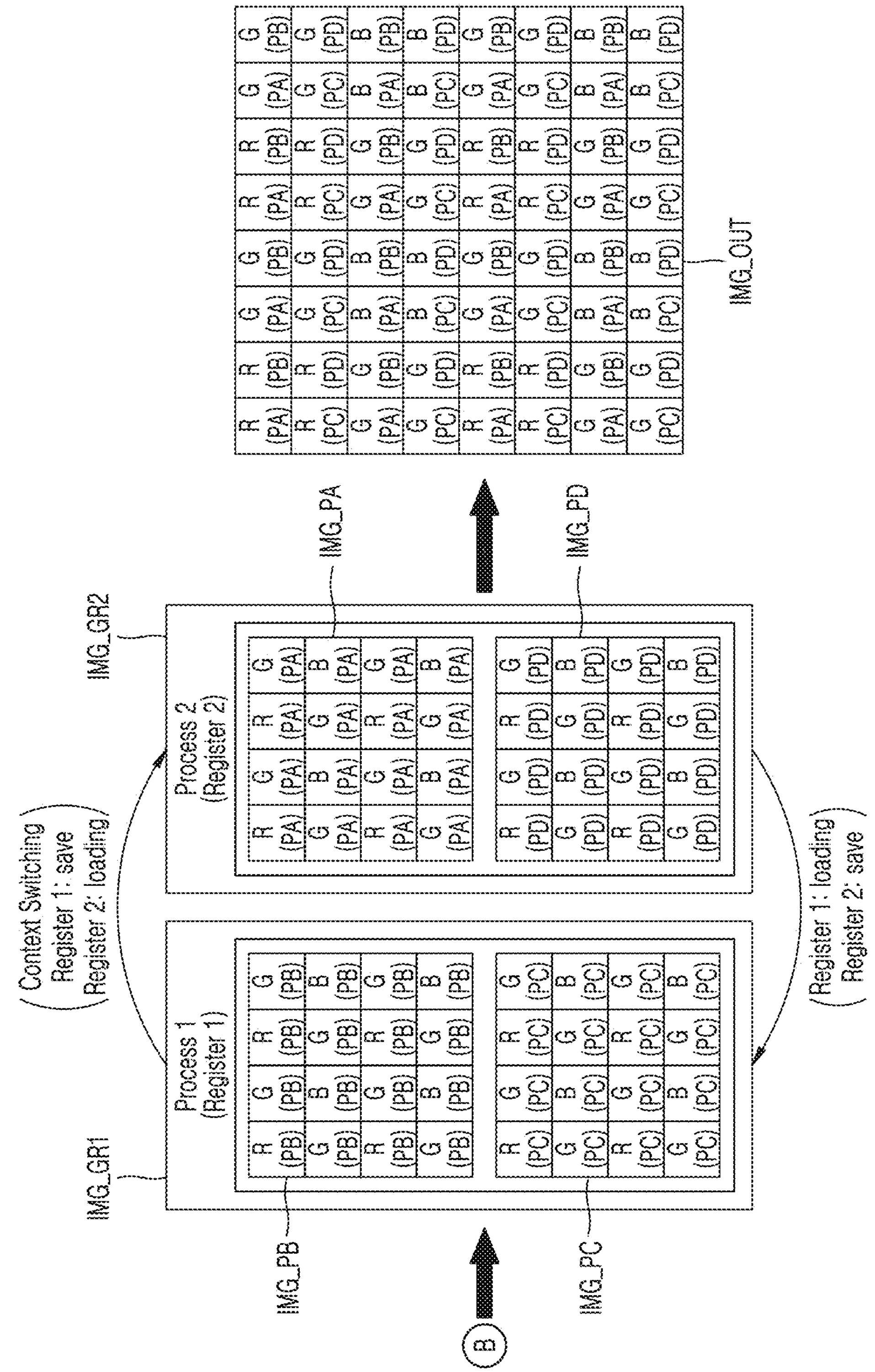
Figure 9:
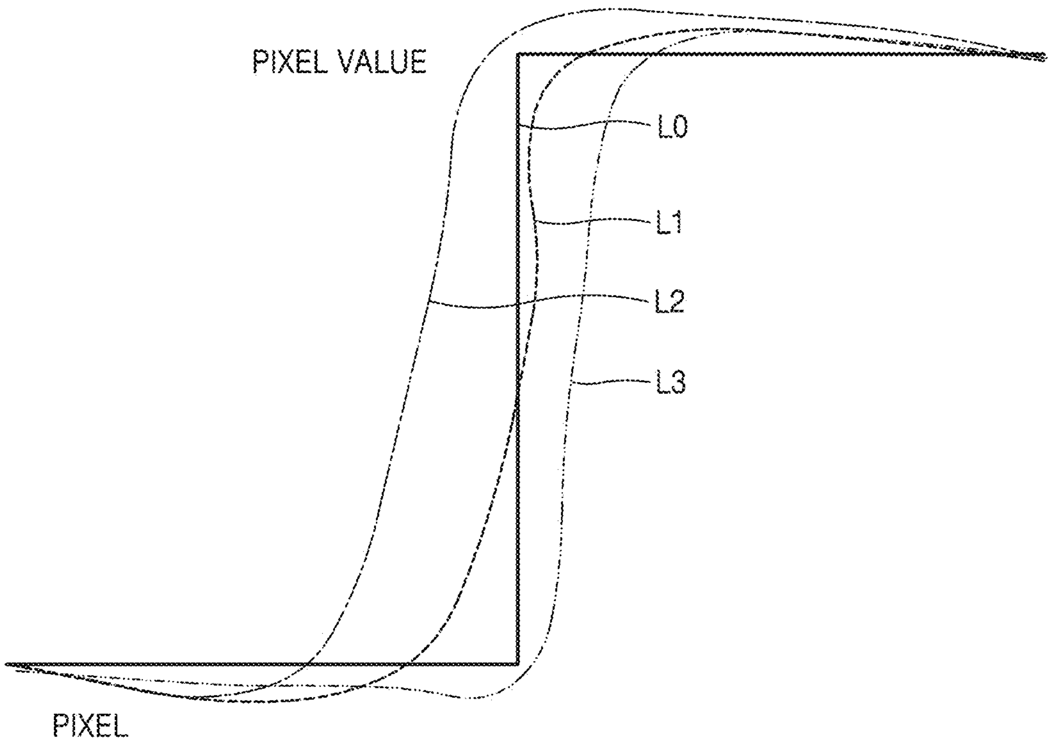
FIG. 9 is a diagram illustrating color shift effects occurring in a step edge according to an embodiment.

According to an embodiment, the quad Bayer pattern array and the quad square Bayer pattern array may include a GRBG pattern in which red pixels are arranged in a first quadrant of a unit pixel, green pixels are arranged in a second quadrant and a fourth quadrant, and blue pixels are arranged in a third quadrant as illustrated in FIGS. 8A and 8B, and an RGGB pattern in which green pixels are arranged in a first quadrant and a third quadrant of a unit pixel, red pixels are arranged in a second quadrant of a unit pixel, and blue pixels are arranged in a fourth quadrant of a unit pixel, as illustrated in FIGS. 8C and 8D.

According to an embodiment, when the GRBG pattern is included, the first parallax image group IMG_GR1 may include the A parallax image IMP_PA and the D parallax image IMG_PD, and the second parallax image group IMG_GR2 may include the B parallax image IMG_PB and the C parallax image IMG_PC. Because of characteristics on the design of the image sensor 10, among the A parallax image IMP_PA, the B parallax image IMG_PB, the C parallax image IMG_PC, and the D parallax image IMG_PD, image characteristics of the A parallax image IMP_PA and the D parallax image IMG_PD arranged in a 135° diagonal direction may be similar, and image characteristics of the B parallax image IMG_PB and the C parallax image IMG_PC arranged in a 45° diagonal direction may be similar.

The first parallax image group IMG_GR1 may have better/improved image characteristics as compared to the image characteristics of the second parallax image group IMG_GR2. That is, at least one image characteristic of the first parallax image group IMG_GR1 may be greater than, more optimal than, of higher quality than, etc., at least one image characteristic of the second parallax image group IMG_GR2. For example, the color shift of the first parallax image group IMG_GR1 may be less than the color shift of the second parallax image group IMG_GR2. Referring to the graph shown in FIG. 9, the edge transition of the red color L2 and blue color L3 is further off the step edge L0 of the image in comparison with the green color L1, causing chromatic aberration at the edge which may lead to color shifting. Such color shifting may be greater with the second parallax image group IMG_GR2 than the first parallax image group IMG_GR1. In this regard, the horizontal axis of the step edge L0 represents pixels, and the vertical axis represents RGB pixel values.

The noise level of the second parallax image group IMG_GR2 may be greater than the noise level of the first parallax image group IMG_GR1.

According to another embodiment, when the RGGB pattern is included, the first parallax image group IMG_GR1 may include the B parallax image IMG_PB and the C parallax image IMG_PC, and the second parallax image group IMG_GR2 may include the A parallax image IMP_PA and the D parallax image IMG_PD. Because of characteristics on the design of the image sensor 10, among the A parallax image IMP_PA, the B parallax image IMG_PB, the C parallax image IMG_PC, and the D parallax image IMG_PD, image characteristics of the A parallax image IMP_PA and the D parallax image IMG_PD arranged in a 135° diagonal direction may be similar, and image characteristics of the B parallax image IMG_PB and the C parallax image IMG_PC arranged in a 45° diagonal direction may be similar.

The first parallax image group IMG_GR1 may have better/improved image characteristics as compared to the image characteristics of the second parallax image group IMG_GR2. That is, at least one image characteristic of the first parallax image group IMG_GR1 may be greater than, more optimal than, of higher quality than, etc., at least one image characteristic of the second parallax image group IMG_GR2. For example, the color shift of the first parallax image group IMG_GR1 may be less than the color shift of the second parallax image group IMG_GR2. Referring to the graph shown in FIG. 9, the edge transition of the red color L2 and blue color L3 are further off the step edge L0 of the image in comparison with the green color L1, causing chromatic aberration at the edge, which may lead to color shifting. Such color shifting may be greater with the second parallax image group IMG_GR2 than the first parallax image group IMG_GR1. The noise level of the second parallax image group IMG_GR2 may be greater than the noise level of the first parallax image group IMG_GR1.

Conventionally, to process the plurality of parallax images IMG_PA, IMG_PB, IMG_PC, and IMG_PD, a logic for each of the parallax images may be required. However, as described above, when different parallax images have similar image characteristics, such parallax images having similar image characteristics may be grouped and then the image processing may be performed thereon by group, which may have an advantage in cost reduction. That is, instead of including four logics for processing four parallax images IMG_PA, IMG_PB, IMG_PC, and IMG_PD, when the image processing is performed on paired parallax images having similar image characteristics, only two logics 21 and 22 may be needed for the image processing.

In addition, to perform image processing by the first logic 21 and the second logic 22, a register (or parameter) required for image processing should be loaded from the memory MEM, and when the image processing is performed on the paired parallax images having similar image characteristics, the first logic 21 and the second logic 22 may be designed to share one memory MEM.

The image processing on the first parallax image group IMG_GR1 and the second parallax image group IMG_GR2 may be performed using the context switching described above.

A first register applied to the first parallax image group IMG_GR1 during the first process in which the first parallax image group IMG_GR1 is processed may be stored in the process control block area of the kernel memory, and a second register applied to the second parallax image group IMG_GR2 may be preloaded to the process control block area of the kernel memory. On the contrary, the second register applied to the second parallax image group IMG_GR2 during the second process in which the second parallax image group IMG_GR2 is processed may be stored in the process control block area of the kernel memory, and the first register applied to the first parallax image group IMG_GR1 may be preloaded to the process control block area of the kernel memory.

Then, the processor 20 may generate an output image IMG_OUT by combining the A parallax image IMP_PA, the B parallax image IMG_PB, the C parallax image IMG_PC, and the D parallax image IMG_PD which are processed according to the first parallax image group IMG_GR1 and the second parallax image group IMG_GR2.

The meta prism array MP may operate efficiently with respect to incident light within a particular angle range on the image sensor. However, when the incident angle exceeds the particular angle range, the color separation performance of the meta prism array MP may be degraded. As such, when the light efficiency of the meta prism array MP decreases in an area where a chief ray angle (CRA) increases, to compensate for the decreased light efficiency, the processor 20 may perform image processing.

When reading a register (or parameter) through the context switching, the processor 20 according to an embodiment may read different registers for a central area and an edge area of an image instead of reading the same register for the entire image. By doing so, the context switching ratio may be greater when performing the image processing on the edge area of the image than when performing the image processing on the central area of the image. As such, by increasing the context switching ratio, the quality of image may be improved even in the area of great CRAs.

Referring back to FIGS. 1, 8A, 8B, 8C, and 8D, the processor 20 may perform white balancing before generating the plurality of parallax images IMG_PA, IMG_PB, IMG_PC, and IMG_PD from the input image IMG_IN.

The white balancing may refer to an operation of adjusting a gain of R and B based on G to have the same RGB ratio of a grey area under light of various color temperatures. Conceptually, the white balancing refers to an operation of normalizing lighting effects of a captured scene to make all objects look like captured under ideal "white light."

In this regard, when performing the white balancing, the processor 20 may apply a same parameter (of register) by group to the first parallax image group IMG_GR1 and the second parallax image group IMG_GR2, each sharing similar image characteristics. When the image sensor 10 includes the meta prism array MP, to improve sensitivity of the image sensor, different parameters (or registers) may be applied to four parallax images IMG_PA, IMG_PB, IMG_PC, and IMG_PD.

The color shading refers to color deviation caused among pixels of different channels out of adjacent pixels due to different channel characteristics of a color filter. There may be color deviation in the same channel for various reasons among 4 pixels of a same color arranged in a 2×2 array (including 2 rows and 2 columns), such as a quad Bayer pattern.

The processor 20 may correct color deviation among channels by applying correction gains of different values according to a color channel. For example, a correction gain function having different coefficients by color channel may be preset, and the processor 20 may correct the color deviation by applying the correction gain function for each channel to the pixels of each channel. The correction gain function for each channel may be a function of two or more dimensions. Aside from the above method using the correction gain function, various correction methods such as a method of using a lookup table storing correction gain values by channel, etc. may be applied.

When performing the color shading correction and the color shift correction, the processor 20 may align the red channel and the blue channel based on the green channel of the first parallax image group IMG_GR1. As for the quad Bayer pattern, which is a 4×4 repeated pattern, 8 green pixels are present therein, and the reference value for correction may need to be selected. As described above, on the design of image sensor, in the GRBG pattern, the green pixel values of the A parallax image IMP_PA and the D parallax image IMG_PD arranged in the 135° diagonal direction of the first parallax image group IMG_GR1 are similar to each other, and image characteristics thereof are also similar to each other. The red pixel values and the blue pixel values may be aligned based on those green pixel values to perform the color shading correction and the color shift correction. On the contrary, in the RGGB pattern, the green pixel values of the B parallax image IMG_PB and the C parallax image IMG_PC arranged in the 45° diagonal direction of the first parallax image group IMG_GR1 are similar to each other, and image characteristics thereof are also similar to each other. The red pixel values and the blue pixel values may be aligned based on those green pixel values to perform the color shading correction and the color shift correction.

When the image obtaining apparatus 100 operates in the low power mode, the processor 20 according to an embodiment may perform image processing only on the second parallax image group IMG_GR2 between the first parallax image group IMG_GR1 and the second parallax image group IMG_GR2. In the GRBG pattern, a decrease in image quality in the full mode (e.g., a mode in which an entire input image is processed without using 2×2 binning) may be caused by degradation of the B parallax image IMG_PB and the C parallax image IMG_PC due to design characteristics of the image sensor (e.g., in the RGGB pattern, a decrease in image quality in the full mode may be due to degradation of the A parallax image IMP_PA and the D parallax image IMG_PD). Such operation may lead to reduction of power consumption of the image obtaining apparatus 100 in half.

Figure 10:
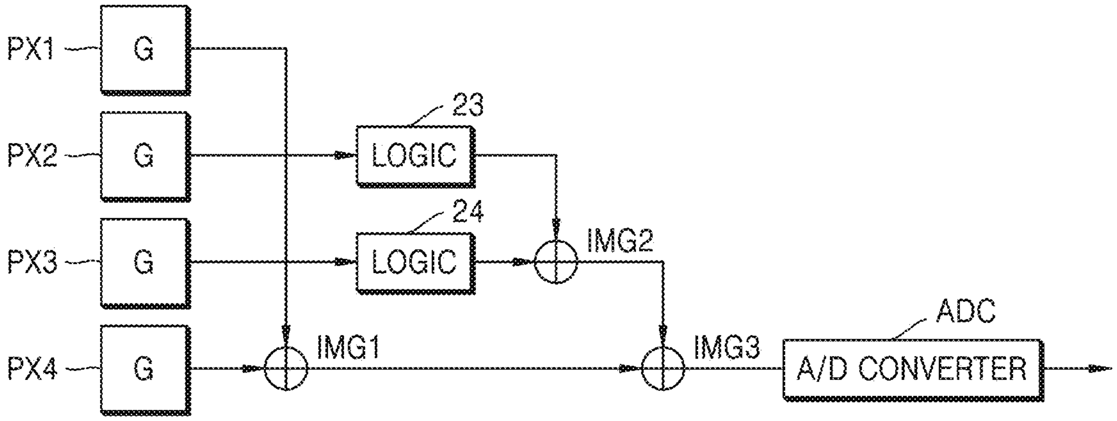
FIG. 10 is a diagram illustrating an analog binning mode of an image obtaining apparatus according to an embodiment.

FIG. 10 is a diagram illustrating an analog binning mode of an image obtaining apparatus according to an embodiment. In the case of a Bayer pattern, the analog binning mode may refer to a method capable of having an effect that may be achieved when, after the light received by the photo diode PD1 and PD2 (see FIG. 5C) is converted into charges, four charges are combined before they are converted by an ADC, as if the light has been received by a pixel obtained by combining pixel pitches of four pixels.

Referring to FIGS. 1, 5A, and 10, in the analog binning mode, the processor 20 according to an embodiment may generate, when the GRBG pattern is included, an analog first combination image IMG1 by combining the A parallax image (e.g., the first pixel PX1) and the D parallax image (e.g., the fourth pixel PX4) of a same color (e.g., green G), generate an analog second combination image IMG2 by combining the B parallax image (e.g., the second pixel PX2) and the C parallax image (e.g., the third pixel PX3) of a same color after performing the color shift correction (and/or color shading correction) thereon through the logics 23 and 24, and then generate an analog third combination image IMG3 by performing weighted summation on the first combination image IMG1 and the second combination image IMG2. When generating the third combination image IMG3, the processor 20 according to an embodiment may set a weight applied to the second combination image IMG2 to be lower than a weight applied to the first combination image IMG1. This is to achieve a target quantum efficiency (QE) by applying a higher weight to the A parallax image (e.g., the first pixel PX1) and the D parallax image (e.g., the fourth pixel PX4) (each having good image characteristics) than to the B parallax image (e.g., the second pixel PX2) and the C parallax image (e.g., the third pixel PX3) (each having bad image characteristics), based on the design characteristics of image sensor. Then, the processor 20 may digital-convert the third combination image IMG3 through an ADC. Although the embodiment of FIG. 10 is described focusing on the green pixels of the quad Bayer pattern for convenience of description, the foregoing may be applied to the red pixels and the blue pixels as well.

In the case of quad square Bayer pattern, referring to FIG. 5B, after an analog first combination image IMG1 is generated by combining the A parallax image (e.g., the first pixel PX1' to the fourth pixel PX4') and the D parallax image (e.g., the thirteenth pixel PX13' to the sixteenth pixel PX16') of the same color, and an analog second combination image IMG2 is generated by combining the B parallax image (e.g., the fifth pixel PX5' to the eighth pixel PX8') and the C parallax image (e.g., the ninth pixel PX9' to the twelfth pixel PX12') of the same color after performing the color shift correction thereon through the logics 23 and 24, weight summation may be performed on the first combination image IMG1 and the second combination image IMG2 to generate an analog third combination image IMG3. When generating the third combination image IMG3, the processor 20 according to an embodiment may set a weight applied to the second combination image IMG2 to be lower than a weight applied to the first combination image IMG1. Then, the processor 20 may digital-convert the third combination image IMG3 through the ADC.

The method of performing image processing when the image sensor 10 includes the quad Bayer pattern (see FIG. 5A) has been described in relation to FIGS. 8A to 9. However, the image processing described above may be applied to the quad square Bayer pattern (see FIG. 5B) as well.

More specifically, in the case of quad square Bayer pattern, in the GRBG pattern, the first parallax image group IMG_GR1 may include the A parallax image IMP_PA and the D parallax image IMG_PD, and the second parallax image group IMG_GR2 may include the B parallax image IMG_PB and the C parallax image IMG_PC as illustrated in FIGS. 8A and 8B. In the case of quad Bayer pattern, each of the parallax images IMG_PA, IMG_PB, IMG_PC, and IMG_PD may correspond to a Bayer pattern arranged in a 2×2 array (including 2 rows and 2 columns). In the case of quad square Bayer pattern, each of the parallax images IMG_PA, IMG_PB, IMG_PC, and IMG_PD may correspond to a quad Bayer pattern arranged in a 4×4 array (including 4 rows and 4 columns). Aside from the aforementioned difference, other features may be substantially the same.

According to an embodiment, in the case of quad square Bayer pattern, in the RGGB pattern, the first parallax image group IMG_GR1 may include the B parallax image IMG_PB and the C parallax image IMG_PC, and the second parallax image group IMG_GR2 may include the A parallax image IMP_PA and the D parallax image IMG_PD. In the case of quad Bayer pattern, each of the parallax images IMG_PA, IMG_PB, IMG_PC, and IMG_PD may correspond to a Bayer pattern arranged in a 2×2 array (including 2 rows and 2 columns). In the case of quad square Bayer pattern, each of the parallax images IMG_PA, IMG_PB, IMG_PC, and IMG_PD may correspond to a quad Bayer pattern arranged in a 4×4 array (including 4 rows and 4 columns). Aside from the aforementioned difference, other features may be substantially the same.

As such, when processing a quad square Bayer pattern, each of the first logic 21 and the second logic 22 illustrated in FIG. 7 may be designed to process the quad Bayer pattern. However, the disclosure is not limited thereto, and to use the first logic 21 and the second logic 22 designed to process a Bayer pattern, the processor 20 may divide the parallax images IMG_PA, IMG_PB, IMG_PC, and IMG_PD of the quad Bayer pattern into four groups and generate parallax images of the Bayer pattern. Then, the image processing may be performed on a total of sixteen parallax images of the Bayer pattern.

Hereinafter, other embodiments are described. The embodiments below are described focusing on the differences and any redundant descriptions on the same features are omitted or simplified.

Figure 11:
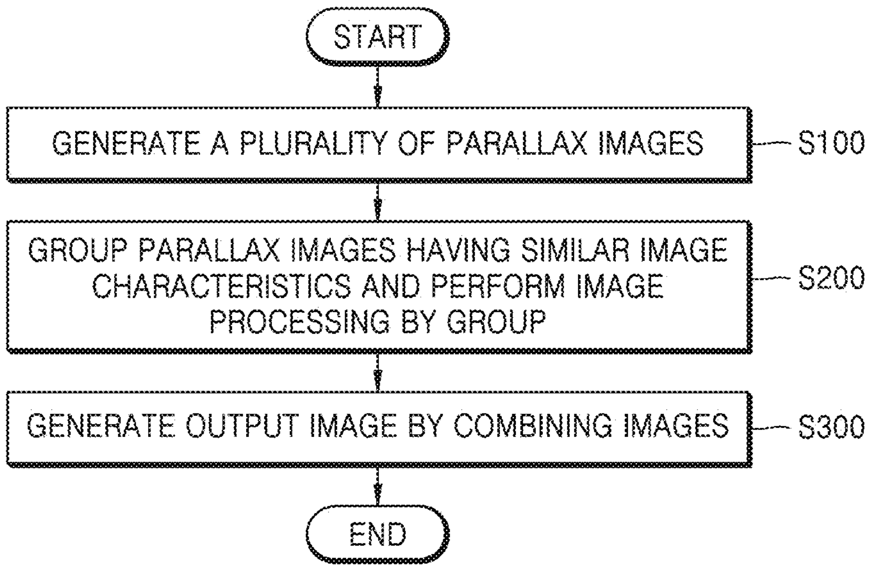
FIG. 11 is a flowchart illustrating an image processing method of an image obtaining apparatus according to an embodiment.

FIG. 11 is a flowchart illustrating an image processing method of an image obtaining apparatus according to an embodiment. Although some of the features described above in relation to FIGS. 1 to 10 are not explicitly shown in FIG. 11, such features may also be applied to the embodiment of FIG. 11.

Referring to FIGS. 1 to 10, a method of obtaining an image according to an embodiment may include generating a plurality of parallax images IMG_PA, IMG_PB, IMG_PC, and IMG_PD having a same parallax from an input image IMG_IN in operation S100, grouping parallax images having similar image characteristics among the plurality of parallax images IMG_PA, IMG_PB, IMG_PC, and IMG_PD and performing image processing thereon by group in operation S200, and generating an output image IMG_OUT by combining the image processed parallax images in operation S300.

The image characteristics may include noise level, color shift, and color shading of an image.

The parallax images IMG_PA, IMG_PB, IMG_PC, and IMG_PD may be grouped into the first parallax image group IMG_GR1 and the second parallax image group IMG_GR2, and the image processing on the first parallax image group IMG_GR1 and the second parallax image group IMG_GR2 may be performed using the context switching.

According to an embodiment, when the GRBG pattern is included, the first parallax image group IMG_GR1 may include the A parallax image IMP_PA and the D parallax image IMG_PD, and the second parallax image group IMG_GR2 may include the B parallax image IMG_PB and the C parallax image IMG_PC. Because of characteristics on the design of the image sensor 10, among the A parallax image IMP_PA, the B parallax image IMG_PB, the C parallax image IMG_PC, and the D parallax image IMG_PD, image characteristics of the A parallax image IMP_PA and the D parallax image IMG_PD arranged in a 135° diagonal direction may be similar, and image characteristics of the B parallax image IMG_PB and the C parallax image IMG_PC arranged in a 45° diagonal direction may be similar.

The first parallax image group IMG_GR1 may have better/improved image characteristics as compared to the image characteristics of the second parallax image group IMG_GR2. That is, at least one image characteristic of the first parallax image group IMG_GR1 may be greater than, more optimal than, of higher quality than, etc., at least one image characteristic of the second parallax image group IMG_GR2. For example, the color shift of the first parallax image group IMG_GR1 may be less than the color shift of the second parallax image group IMG_GR2. For example, referring to the graph shown in FIG. 9, the edge transition of the red color L2 and blue color L3 are further off the step edge L0 of the image in comparison with the green color L1, causing chromatic aberration at the edge, which may lead to color shifting. Such color shifting may greater with the second parallax image group IMG_GR2 than the first parallax image group IMG_GR1. The noise level of the second parallax image group IMG_GR2 may be greater than the noise level of the first parallax image group IMG_GR1.

According to another embodiment, when the RGGB pattern is included, the first parallax image group IMG_GR1 may include the B parallax image IMG_PB and the C parallax image IMG_PC, and the second parallax image group IMG_GR2 may include the A parallax image IMP_PA and the D parallax image IMG_PD. Because of characteristics on the design of the image sensor 10, among the A parallax image IMP_PA, the B parallax image IMG_PB, the C parallax image IMG_PC, and the D parallax image IMG_PD, image characteristics of the A parallax image IMP_PA and the D parallax image IMG_PD arranged in a 135° diagonal direction may be similar, and image characteristics of the B parallax image IMG_PB and the C parallax image IMG_PC arranged in a 45° diagonal direction may be similar.

The first parallax image group IMG_GR1 may have better/improved image characteristics as compared to the image characteristics of the second parallax image group IMG_GR2. That is, at least one image characteristic of the first parallax image group IMG_GR1 may be greater than, more optimal than, of higher quality than, etc., at least one image characteristic of the second parallax image group IMG_GR2. For example, the color shift of the first parallax image group IMG_GR1 may be less than the color shift of the second parallax image group IMG_GR2. In other words, referring to the graph shown in FIG. 9, the edge transition of the red color L2 and blue color L3 are further off the step edge L0 of the image in comparison with the green color L1, causing chromatic aberration at the edge, which may lead to color shifting. Such color shifting may be greater with the second parallax image group IMG_GR2 than the first parallax image group IMG_GR1. The noise level of the second parallax image group IMG_GR2 may be greater than the noise level of the first parallax image group IMG_GR1.

In general, to process the plurality of parallax images IMG_PA, IMG_PB, IMG_PC, and IMG_PD, a logic for each of the parallax images is needed. However, as described above, when different parallax images have similar image characteristics, such parallax images having similar image characteristics may be grouped and then the image processing may be performed thereon by group, which may have an advantage in cost reduction. That is, instead of including four logics for processing four parallax images IMG_PA, IMG_PB, IMG_PC, and IMG_PD, when the image processing is performed on paired parallax images having similar image characteristics, only two logics 21 and 22 may be needed for the image processing.

In addition, to perform image processing by the first logic 21 and the second logic 22, a register (or parameter) required for image processing may be loaded from the memory MEM, and when the image processing is performed on the paired parallax images having similar image characteristics, the first logic 21 and the second logic 22 may be designed to share one memory MEM.

The image processing on the first parallax image group IMG_GR1 and the second parallax image group IMG_GR2 may be performed using the context switching described above.

A first register applied to the first parallax image group IMG_GR1 during the first process in which the first parallax image group IMG_GR1 is processed may be stored in the process control block area of the kernel memory, and a second register applied to the second parallax image group IMG_GR2 may be preloaded to the process control block area of the kernel memory. On the contrary, the second register applied to the second parallax image group IMG_GR2 during the second process in which the second parallax image group IMG_GR2 is processed may be stored in the process control block area of the kernel memory, and the first register applied to the first parallax image group IMG_GR1 may be preloaded to the process control block area of the kernel memory.

Then, the processor 20 may generate an output image IMG_OUT by combining the A parallax image IMP_PA, the B parallax image IMG_PB, the C parallax image IMG_PC, and the D parallax image IMG_PD which are processed according to the first parallax image group IMG_GR1 and the second parallax image group IMG_GR2.

The method of obtaining an image according to an embodiment may further include performing white balancing on the input image by applying a same parameter according to the first parallax image group IMG_GR1 and the second parallax image group IMG_GR2. In this regard, when performing the white balancing, the processor 20 may apply the same parameter (of register) by group to the first parallax image group IMG_GR1 and the second parallax image group IMG_GR2, each sharing similar image characteristics. When the image sensor 10 includes the meta prism array MP, to improve sensitivity of the image sensor, different parameters (or registers) may be applied to four parallax images IMG_PA, IMG_PB, IMG_PC, and IMG_PD.

Figure 12:
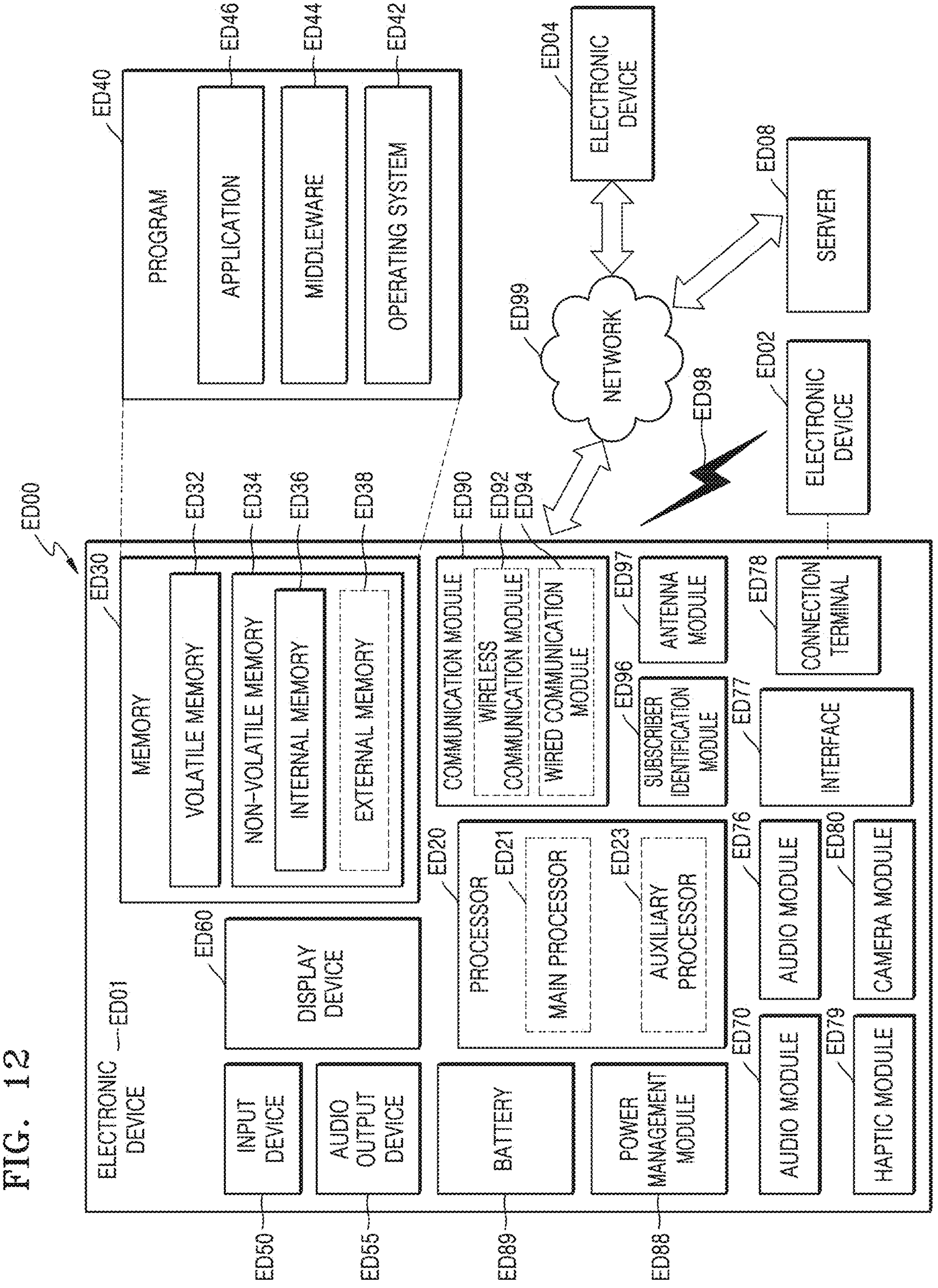
FIG. 12 is a diagram of an electronic device including an image sensor according to an embodiment.

FIG. 12 is a diagram of an electronic device including an image sensor according to an embodiment. Referring to FIG. 12, in a network environment ED00, the electronic device ED01 may communicate with another electronic device ED02 through a first network ED98 (short-range wireless communication network, and the like), or communicate with another electronic device ED04 and/or a server ED08 through a second network ED99 (long-range wireless communication network, and the like). The electronic device ED01 may communicate with the electronic device ED04 through the server ED08. The electronic device ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (the display device ED60, and the like) of constituent elements may be omitted or other constituent elements may be added. Some of the constituent elements may be implemented by one integrated circuit. For example, the sensor module ED76 (a fingerprint sensor, an iris sensor, an illuminance sensor, and the like) may be implemented by being embedded in the display device ED60 (a display, and the like).

The processor ED20 may control one or a plurality of other constituent elements (hardware and software constituent elements, and the like) of the electronic device ED01 connected to the processor ED20 by executing software (a program ED40, and the like), and perform various data processing or calculations. As part of the data processing or calculations, the processor ED20 may load, in a volatile memory ED32, commands and/or data received from other constituent elements (the sensor module ED76, the communication module ED90, and the like), process the command and/or data stored in the volatile memory ED32, and store result data in a non-volatile memory ED34. The processor ED20 may include a main processor ED21 (a central processing unit, an application processor, and the like) and an auxiliary processor ED23 (a graphics processing unit, an image signal processor, a sensor hub processor, a communication processor, and the like) that is operable independently of or together with the main processor ED21. The auxiliary processor ED23 may use less power than the main processor ED21 and may perform a specialized function.

The auxiliary processor ED23, in place of the main processor ED21 when the main processor ED21 is in an inactive state (sleep state), or with the main processor ED21 when the main processor ED21 is in an active state (application execution state), may control functions and/or states related to some constituent elements (the display device ED60, the sensor module ED76, the communication module ED90, and the like) of the constituent elements of the electronic device ED01. The auxiliary processor ED23 (an image signal processor, a communication processor, and the like) may be implemented as a part of functionally related other constituent elements (the camera module ED80, the communication module ED90, and the like).

The memory ED30 may store various data needed by the constituent elements (the processor ED20, the sensor module ED76, and the like) of the electronic device ED01. The data may include, for example, software (the program ED40, and the like) and input data and/or output data about commands related thereto. The memory ED30 may include the volatile memory ED32 and/or the non-volatile memory ED34.

The program ED40 may be stored in the memory ED30 as software, and may include an operating system ED42, middleware ED44, and/or an application ED46.

The input device ED50 may receive commands and/or data to be used for constituent elements (the processor ED20, and the like) of the electronic device ED01, from the outside (a user, and the like) of the electronic device ED01. The input device ED50 may include a microphone, a mouse, a keyboard, and/or a digital pen (a stylus pen, and the like).

The audio output device ED55 may output an audio signal to the outside of the electronic device ED01. The audio output device ED55 may include a speaker and/or a receiver. The speaker may be used for general purposes such as multimedia playback or recording playback, and the receiver can be used to receive incoming calls. The receiver may be implemented by being coupled as a part of the speaker or by an independent separate device.

The display device ED60 may visually provide information to the outside of the electronic device ED01. The display device ED60 may include a display, a hologram device, or a projector, and a control circuit to control a corresponding device. The display device ED60 may include a touch circuitry set to detect a touch and/or a sensor circuit (a pressure sensor, and the like) set to measure the strength of a force generated by the touch.

The audio module ED70 may convert sound into electric signals or reversely electric signals into sound. The audio module ED70 may obtain sound through the input device ED50, or output sound through a speaker and/or a headphone of another electronic device (the electronic device ED02, and the like) connected to the audio output device ED55 and/or the electronic device ED01 in a wired or wireless manner.

The sensor module ED76 may detect an operation state (power, temperature, and the like) of the electronic device ED01, or an external environment state (a user state, and the like), and generate an electric signal and/or a data value corresponding to a detected state. The sensor module ED76 may include a gesture sensor, a gyro sensor, a barometric pressure sensor, a magnetic sensor, an acceleration sensor, a grip sensor, a proximity sensor, a color sensor, an IR sensor, a biometric sensor, a temperature sensor, a humidity sensor, and/or an illuminance sensor.

The interface ED77 may support one or a plurality of specified protocols used for the electronic device ED01 to be connected to another electronic device (the electronic device ED02, and the like) in a wired or wireless manner. The interface ED77 may include a high definition multimedia interface (HDMI), a universal serial bus (USB) interface, an SD card interface, and/or an audio interface.

A connection terminal ED78 may include a connector for the electronic device ED01 to be physically connected to another electronic device (the electronic device ED02, and the like). The connection terminal ED78 may include an HDMI connector, a USB connector, an SD card connector, and/or an audio connector (a headphone connector, and the like).

The haptic module ED79 may convert electric signals into mechanical stimuli (vibrations, movements, and the like) or electric stimuli that are perceivable by a user through tactile or motor sensations. The haptic module ED79 may include a motor, a piezoelectric device, and/or an electric stimulation device.

The camera module ED80 may capture a still image and a video. The camera module ED80 may include a lens assembly including one or a plurality of lenses, the image sensor 10, image signal processors, and/or flashes. The lens assembly included in the camera module ED80 may collect light emitted from a subject for image capturing.

The power management module ED88 may manage power supplied to the electronic device ED01. The power management module ED88 may be implemented as a part of a power management integrated circuit (PMIC).

The battery ED89 may supply power to the constituent elements of the electronic device ED01. The battery ED89 may include non-rechargeable primary cells, rechargeable secondary cells, and/or fuel cells.

The communication module ED90 may establish a wired communication channel and/or a wireless communication channel between the electronic device ED01 and another electronic device (the electronic device ED02, the electronic device ED04, the server ED08, and the like), and support a communication through an established communication channel. The communication module ED90 may be operated independent of the processor ED20 (the application processor, and the like), and may include one or a plurality of communication processors supporting a wired communication and/or a wireless communication. The communication module ED90 may include a wireless communication module ED92 (a cellular communication module, a short-range wireless communication module, a global navigation satellite system (GNSS) communication module, and the like), and/or a wired communication module ED94 (a local area network (LAN) communication module, a power line communication module, and the like). Among the above communication modules, a corresponding communication module may communicate with another electronic device through the first network ED98 (a short-range communication network such as Bluetooth, WiFi Direct, or infrared data association (IrDA)) or the second network ED99 (a long-range communication network, such as a cellular network, the Internet, or a computer network (LAN, WAN, and the like)). These various types of communication modules may be integrated into one constituent element (a single chip, and the like), or may be implemented as a plurality of separate constituent elements (multiple chips). The wireless communication module ED92 may verify and authenticate the electronic device ED01 in a communication network such as the first network ED98 and/or the second network ED99 using subscriber information (an international mobile subscriber identifier (IMSI), and the like) stored in the subscriber identification module ED96.

The antenna module ED97 may transmit signals and/or power to the outside (another electronic device, and the like) or receive signals and/or power from the outside. An antenna may include an emitter formed in a conductive pattern on a substrate (a printed circuit board (PCB), and the like). The antenna module ED97 may include one or a plurality of antennas. When the antenna module ED97 includes a plurality of antennas, the communication module ED90 may select, from among the antennas, an appropriate antenna for a communication method used in a communication network such as the first network ED98 and/or the second network ED99. Signals and/or power may be transmitted or received between the communication module ED90 and another electronic device through the selected antenna. Other parts (an RFIC, and the like) than the antenna may be included as a part of the antenna module ED97.

Some of the constituent elements may be connected to each other through a communication method between peripheral devices (a bus, general purpose input and output (GPIO), a serial peripheral interface (SPI), a mobile industry processor interface (MIPI), and the like) and may mutually exchange signals (commands, data, and the like).

The command or data may be transmitted or received between the electronic device ED01 and the external electronic device ED04 through the server ED08 connected to the second network ED99. The electronic devices ED02 and ED04 may be of a type that is the same as or different from the electronic device ED01. All or a part of operations executed in the electronic device ED01 may be executed in one or a plurality of the electronic devices (ED02, ED04, and ED08). For example, when the electronic device ED01 needs to perform a function or service, the electronic device ED01 may request one or a plurality of electronic devices to perform part of the whole of the function or service, instead of performing the function or service. The one or a plurality of the electronic devices receiving the request may perform additional function or service related to the request, and transmit a result of the performance to the electronic device ED01. To this end, cloud computing, distributed computing, and/or client-server computing technology may be used.

Figure 13:
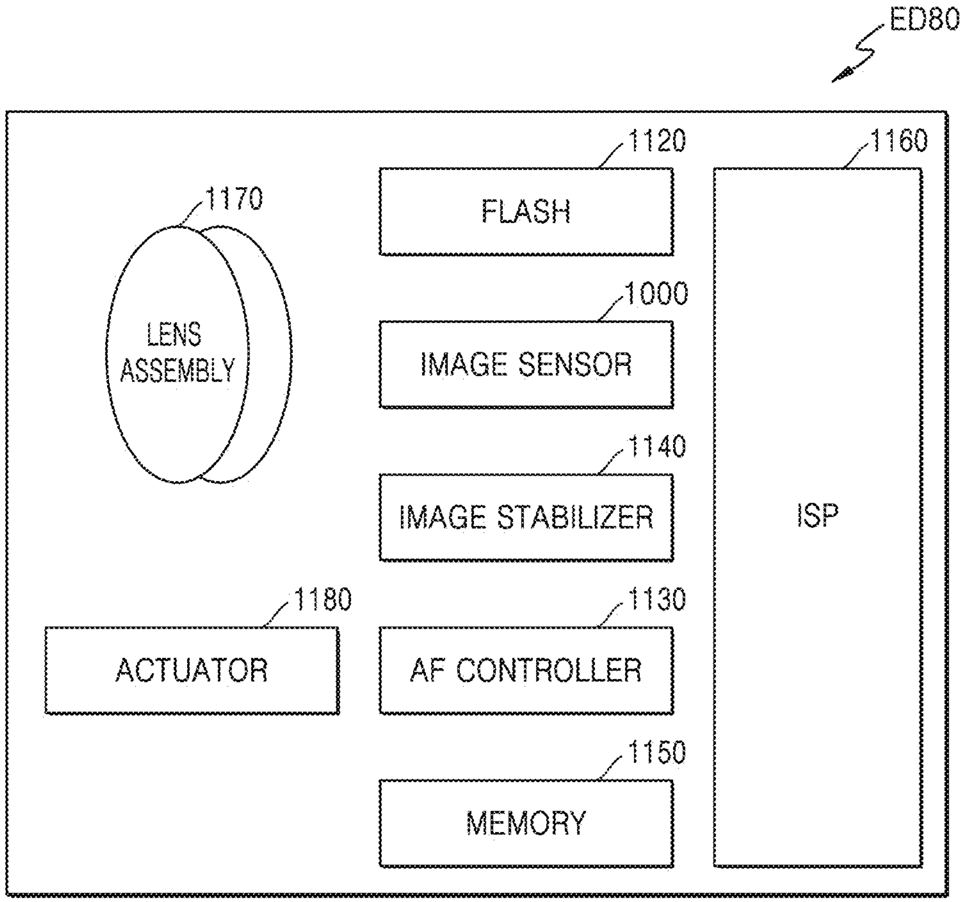
FIG. 13 is a block diagram of a camera module provided in an electronic device according to an embodiment.

FIG. 13 is a block diagram of a camera module provided in an electronic device according to an embodiment. Referring to FIG. 13, the camera module ED80 may include a lens assembly 1170, a flash 1120, an image sensor 1000, an image stabilizer 1140, an AF controller 1130, a memory 1150 (buffer memory, etc.), an actuator 1180, and/or an image signal processor (ISP) 1160.

The lens assembly 1170 may collect light emitted from a subject for image capturing. The lens assembly 1170 may include one or more optical lenses. The lens assembly 1170 may include an optical path changing member configured to change an optical path to be directed towards the image sensor 1000. Based on whether the optical path changing member is provided and how it is arranged in relation to an optical lens, the camera module ED80 may have a vertical shape or folded shape. The camera module ED80 may include a plurality of lens assemblies 1170, and in this case, the camera module ED80 may include a dual camera, a 360 degrees camera, or a spherical camera. Some of the lens assemblies 1170 may have the same lens attributes (a viewing angle, a focal length, AF, F Number, optical zoom, and the like), or different lens attributes. The lens assembly 1170 may include a wide angle lens or a telescopic lens.

The actuator 1180 may drive the lens assembly 1170. The actuator 180 may move, for example, at least some of the optical lens and the optical path changing member constituting the lens assembly 1170. The optical lens may move along an optical axis and move at least a part of the optical lenses included in the lens assembly 1170 to adjust a distance between neighboring lenses, thereby adjusting an optical zoom ratio accordingly.

The actuator 1180 may adjust a position of any one of the optical lenses included in the lens assembly 1170 such that the image sensor 1000 is located at a focal length of the lens assembly 1170. The actuator 1180 may drive the lens assembly 1170 according to the AF drive signal transmitted from the AF controller 1130.

The flash 1120 may emit light used to reinforce light emitted or reflected from a subject. The flash 1120 may emit visible light or infrared light. The flash 1120 may include one or a plurality of light-emitting diodes (a red-green-blue (RGB) light-emitting diode (LED), a white LED, an infrared LED, an ultraviolet LED, and the like), and/or a xenon lamp. The image sensor 1000 may be the image sensor 10 described in relation to FIG. 1. The image sensor 1000 may obtain an image corresponding to an object by converting light, which has been emitted or reflected from the object and then transmitted via the lens assembly 1170, into electric signals.

The image sensor 1000 may include the meta prism array MP described above, and each pixel may include a plurality of light sensing cells forming a plurality of channels (for example, a plurality of light sensing cells arranged in a 2×2 array). Such pixels may be used as AF pixels, and the image sensor 10 may generate an AF drive signal from signals of the plurality of channels in the AF pixels.

The image stabilizer 1140 may move, in response to a movement of the camera module ED80 or an electronic device ED01 including the same, one or a plurality of lenses included in the lens assembly 1170 or the image sensor 1000 in a particular direction or may compensate a negative effect due to the movement by controlling (adjusting a read-out timing, and the like) the movement characteristics of the image sensor 1000. The image stabilizer 1140 may detect a movement of the camera module ED80 or the electronic device ED01 using a gyro sensor or an acceleration sensor arranged inside or outside the camera module ED80. The image stabilizer 1140 may be implemented in an optical form.

The AF controller 1130 may generate an AF drive signal from signal values sensed from AF pixels of the image sensor 1000. The AF controller 1130 may control the actuator 1180 according to the AF drive signal.

The memory 1150 may store a part or entire data of an image obtained through the image sensor 1000 for a subsequent image processing operation. For example, when a plurality of images are obtained at high speed, only low resolution images are displayed while the obtained original data (Bayer-patterned data, high resolution data, and the like) is stored in the memory 1150. Then, the memory 1150 may be used to transmit the original data of a selected (user selection, and the like) image to the image signal processor 1160. The memory 1150 may be incorporated into the memory ED30 of the electronic device ED01, or configured to be an independently operated separate memory.

The image signal processor 1160 may perform an image processing operation on the image obtained through the image sensor 1000 or the image data stored in the memory 1150. The image processing operation may include depth map generation, three-dimensional modeling, panorama generation, feature point extraction, image synthesis, and/or image compensation (noise reduction, resolution adjustment, brightness adjustment, blurring, sharpening, softening, and the like). The image signal processor 1160 may perform control (exposure time control, or read-out timing control, and the like) on constituent elements (the image sensor 1000, and the like) included in the camera module ED80. The image processed by the image signal processor 1160 may be stored again in the memory 1150 for additional processing or provided to external constituent elements (the memory ED30, the display device ED60, the electronic device ED02, the electronic device ED04, the server ED08, and the like) of the camera module ED80. The image signal processor 1160 may be incorporated into the processor ED20, or configured to be a separate processor operated independently of the processor ED20. When the image signal processor 1160 is configured by a separate processor from the processor ED20, the image processed by the image signal processor 1160 may undergo additional image processing by the processor ED20 and then displayed through the display device ED60.

The AF controller 1130 may be integrated into the image signal processor 1160. The image signal processor 1160 may generate an AF signal by processing a signal from autofocusing pixels of the image sensor 1000, and the AF controller 1130 may convert the AF signal into an actuator 1180 drive signal and transmit the same to the actuator 1180.

The image sensor 1000 according to embodiments may be applied to various electronic devices.

The image sensor 1000 according to embodiments may be applied to a mobile phone, a smartphone, a tablet, a smart tablet, a digital camera, a camcorder, a laptop computer, a television, a smart television, etc. For example, the smartphone or the smart tablet may include a plurality of high resolution cameras, each having a high resolution image sensor mounted thereon. Depth information of subjects in an image may be extracted using a high resolution cameras, out focusing of the image may be adjusted, or subjects in the image may be automatically identified.

In addition, the image sensor 1000 may be applied to a smart refrigerator, a security camera, a robot, a medial cameral, etc. For example, the smart refrigerator may automatically recognize food in a refrigerator, using an image sensor, and notify a user of the presence of a particular food, the type of food that is input or output, etc., through a smartphone. The security camera may provide an ultrahigh resolution image and may recognize an object or a person in an image in a dark environment using high sensitivity. The robot may be provided in a disaster or industrial site that is not directly accessible by people, and may provide a high resolution image. The medical camera may provide a high resolution image for diagnosis or surgery, and thus a field of vision may be dynamically adjusted.

The image sensor 1000 may also be applied to a vehicle. The vehicle may include a plurality of vehicle cameras arranged at various positions, and each of the vehicle cameras may include an image sensor according to an embodiment. The vehicle may provide a driver with various pieces of information about the inside or periphery of the vehicle, using the vehicle cameras, and thus an object or a person in an image may be automatically recognized and information needed for autonomous driving is provided.

In an apparatus and method for obtaining an image according to an embodiment, by generating a plurality of parallax images having the same parallax from an input image obtained by an image sensor and grouping parallax images having similar image characteristics to perform image processing thereon by group, increase in logic and memory may be minimized.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC), Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

At least one of the devices, units, components, modules, units, or the like represented by a block or an equivalent indication in the above embodiments including, but not limited to, FIGS. 1, 7, 10, 12 and 13, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image obtaining apparatus comprising:
- an image sensor comprising a micro lens and a plurality of neighboring pixels sharing the micro lens; and
- a processor configured to:
  - generate, based on an input image received from the image sensor, a plurality of parallax images having a same parallax;
  - group, from among the plurality of parallax images, first parallax images having similar image characteristics, the first parallax images comprising a first parallax image group comprising at least two parallax images and a second parallax image group comprising at least two parallax images;
  - perform at least one image processing operation on the first parallax images; and
  - generate an output image by combining the at least two parallax images of the first parallax image group and the at least two parallax images of the second parallax image group of the first parallax images on which the at least one image processing operation is performed.

2. The image obtaining apparatus of claim 1,
- wherein the processor is further configured to perform the at least one image processing operation on the first parallax images by performing image processing on the first parallax image group and the second parallax image group using context switching.

3. The image obtaining apparatus of claim 2, wherein the processor comprises:
- two logic circuits connected in parallel and configured to simultaneously image-process the first parallax images; and
- a memory configured to be shared and used by the two logic circuits.

4. The image obtaining apparatus of claim 3, wherein the memory comprises random access memory (RAM) comprising a kernel memory area, and wherein the processor is further configured to perform the at least one image processing operation on the first parallax image group and the second parallax image group using context switching by:

preloading a register corresponding to the second parallax image group to a process control block of the kernel memory area during performing of the at least one image processing operation on the first parallax image group.

5. The image obtaining apparatus of claim 2, wherein the image sensor comprises:

a quad Bayer pattern array in which pixels arranged in a 2×2 matrix comprise a color filter of a same color, or a quad square Bayer pattern array in which pixels arranged in a 4×4 matrix comprise a color filter of a same color.

6. The image obtaining apparatus of claim 5, wherein the processor is further configured to generate, based on the input image received from the image sensor, an A parallax image, a B parallax image, a C parallax image, and a D parallax image, wherein the plurality of neighboring pixels sharing the micro lens comprise four pixels, and wherein the A parallax image corresponds to a combination of data values of pixels arranged in a second quadrant, the B parallax image corresponds to a combination of data values of pixels arranged in a first quadrant, the C parallax image corresponds to a combination of data values of pixels arranged in a third quadrant, and the D parallax image corresponds to a combination of data values of pixels arranged in a fourth quadrant.

7. The image obtaining apparatus of claim 6, wherein the quad Bayer pattern array or the quad square Bayer pattern array comprises:

a GRBG pattern comprising:

red pixels in a first quadrant of a first unit pixel;

green pixels in a second quadrant and a fourth quadrant of the first unit pixel; and blue pixels in a third quadrant of the first unit pixel; or an RGGB pattern comprising:

green pixels in a first quadrant and a third quadrant of a second unit pixel;

red pixels in a second quadrant of the second unit pixel; and blue pixels in a fourth quadrant of the second unit pixel.

8. The image obtaining apparatus of claim 7, wherein the quad Bayer pattern array or the quad square Bayer pattern array comprises the GRBG pattern, wherein the first parallax image group comprises the A parallax image and the D parallax image, wherein the second parallax image group comprises the B parallax image and the C parallax image, and wherein a color shift of the first parallax image group is less than a color shift of the second parallax image group.

9. The image obtaining apparatus of claim 8, wherein the image obtaining apparatus is configured to operate in a low power mode, and wherein the processor is configured to perform the at least one image processing operation on only the second parallax image group in the low power mode.

10. The image obtaining apparatus of claim 8, wherein the at least one image processing operation comprises at least one of color shading correction, color shifting correction, and noise correction.

11. The image obtaining apparatus of claim 10, wherein the at least one image processing operation comprises the color shading correction and the color shifting correction, and wherein the processor is further configured to perform the color shading correction and the color shifting correction by aligning a red channel and a blue channel based on a green channel of the first parallax image group.

12. The image obtaining apparatus of claim 8, wherein the at least one image processing operation comprises white balancing on the input image, and wherein the processor is further configured to perform the white balancing on the input image by applying the same parameters by group to the first parallax image group and the second parallax image group.

13. The image obtaining apparatus of claim 8, wherein, in a binning mode, the processor is further configured to:

generate, by unit pixel, a first combination image by combining the A parallax image and the D parallax image, the A parallax image and the D parallax image being of a same color;

generate, after performing a color shifting correction on the B parallax image and the C parallax image, a second combination image by combining the B parallax image and the C parallax image, the B parallax image and the C parallax image being of a same color, and perform a weighted summation on the first combination image and the second combination image.

14. The image obtaining apparatus of claim 7, wherein the quad Bayer pattern array or the quad square Bayer pattern array comprises the RGGB pattern, wherein the first parallax image group comprises the B parallax image and the C parallax image, wherein the second parallax image group comprises the A parallax image and the D parallax image, and wherein a noise level of the first parallax image group is less than a noise level of the second parallax image group.

15. The image obtaining apparatus of claim 6, wherein the processor is further configured to generate the output image by combining the A parallax image, the B parallax image, the C parallax image, and the D parallax image, and wherein the A parallax image, the B parallax image, the C parallax image, and the D parallax image are image-processed by group.

16. The image obtaining apparatus of claim 1, wherein the similar image characteristics comprise at least one of a noise level, a color shift, and a color shading.

17. A method of obtaining an image by an image obtaining apparatus comprising an image sensor comprising a plurality of neighboring pixels sharing a micro lens, the method comprising:

generating, based on an input image received from the image sensor, a plurality of parallax images having a same parallax;

grouping, from among the plurality of parallax images, first parallax images having similar image characteristics, the first parallax images comprising a first parallax image group comprising at least two parallax images and a second parallax image group comprising at least two parallax images;

performing at least one image processing operation on the first parallax images; and generating an output image by combining the at least two parallax images of the first parallax image group and the at least two parallax images of the second parallax image group of the first parallax images on which the at least one image processing operation is performed.

18. The method of claim 17, wherein the performing the at least one image processing operation on the first parallax images comprises performing image processing on the first parallax image group and the second parallax image group using context switching.

19. The method of claim 17, wherein the at least one image processing operation comprises a white balancing operation, and wherein the performing the at least one image processing operation comprises performing white balancing on the input image by applying the same parameters by group to the first parallax image group and the second parallax image group.

20. The method of claim 17, wherein the similar image characteristics comprise at least one of a noise level, a color shift, and a color shading.

* * * * *